United States Patent
Gupta et al.

(10) Patent No.: US 9,243,917 B2
(45) Date of Patent: Jan. 26, 2016

(54) NAVIGATIONAL COORDINATE SYSTEMS IN CONJUNCTION WITH TRANSPORTS AND/OR MOBILE DEVICES

(71) Applicant: QUALCOMM Incorporated, San Diego, CA (US)

(72) Inventors: Rajarshi Gupta, Sunnyvale, CA (US); Saumitra Mohan Das, Santa Clara, CA (US)

(73) Assignee: QUALCOMM Incorporated, San Diego, CA (US)

( * ) Notice: Subject to any disclaimer, the term of this patent is extended or adjusted under 35 U.S.C. 154(b) by 41 days.

(21) Appl. No.: 14/254,797

(22) Filed: Apr. 16, 2014

(65) Prior Publication Data

US 2014/0229109 A1    Aug. 14, 2014

Related U.S. Application Data

(62) Division of application No. 13/046,508, filed on Mar. 11, 2011, now Pat. No. 8,744,748.

(60) Provisional application No. 61/321,730, filed on Apr. 7, 2010.

(51) Int. Cl.
    *G01C 21/20* (2006.01)
    *H04L 29/08* (2006.01)

(52) U.S. Cl.
    CPC .............. *G01C 21/203* (2013.01); *G01C 21/20* (2013.01); *G01C 21/206* (2013.01); *H04L 67/125* (2013.01)

(58) Field of Classification Search
    None
    See application file for complete search history.

(56) References Cited

U.S. PATENT DOCUMENTS

| | | | |
|---|---|---|---|
| 6,801,855 B1* | 10/2004 | Walters et al. | 701/410 |
| 8,374,777 B2* | 2/2013 | Reich | 701/409 |
| 2002/0055872 A1* | 5/2002 | LaBrie et al. | 705/14 |
| 2007/0001904 A1 | 1/2007 | Mendelson | |
| 2007/0143018 A1* | 6/2007 | Murlidar et al. | 701/220 |
| 2010/0008337 A1 | 1/2010 | Bajko | |
| 2010/0088030 A1* | 4/2010 | Stephens et al. | 701/220 |
| 2011/0251787 A1 | 10/2011 | Gupta et al. | |

FOREIGN PATENT DOCUMENTS

| | | |
|---|---|---|
| CN | 101017094 A | 8/2007 |
| CN | 101665150 A | 3/2010 |

(Continued)

OTHER PUBLICATIONS

International Search Report and Written Opinion—PCT/US2011/031159—ISA/EPO—May 30, 2011.

*Primary Examiner* — Rami Khatib
(74) *Attorney, Agent, or Firm* — Arnold J. Gum

(57) ABSTRACT

The subject matter disclosed herein relates to systems, methods, apparatuses, articles, and means for determining at least one navigational coordinate system to be utilized in conjunction with transports and/or mobile devices. For certain example implementations, a method by a mobile device that is at least proximate to a transport may comprise identifying a first navigational coordinate system, with the first navigational coordinate system being associated with the transport and enabling navigation within at least one navigable area of the transport. A second navigational coordinate system may also be identified. The mobile device may determine to utilize at least one of the first navigational coordinate system or the second navigational coordinate system based, at least in part, on one or more predetermined conditions. Other example implementations are described herein.

20 Claims, 15 Drawing Sheets

(56) References Cited

FOREIGN PATENT DOCUMENTS

| | | |
|---|---|---|
| JP | 2002148071 A | 5/2002 |
| JP | 2003035558 A | 2/2003 |
| JP | 2003109149 A | 4/2003 |
| JP | 2003130680 A | 5/2003 |
| JP | 2007233937 A | 9/2007 |
| JP | 2009168561 A | 7/2009 |

* cited by examiner

1200

---

1302

UPDATE LINKING OF FIRST NCS AND SECOND NCS RESPONSIVE TO RELATIVE CHANGE IN POSITION SO THAT A ROUTING BETWEEN A FIRST POI ON A FIRST MAP AND A SECOND POI ON A SECOND MAP CAN BE CORRECTLY DETERMINED

1300

OBTAIN EMERGENCY ROUTING INSTRUCTIONS AT MD, EMERGENCY ROUTING INSTRUCTIONS BASED ON LOCATION OF EMERGENCY AND LOCATION OF MDs AT TRANSPORT

NAVIGATIONAL COORDINATE SYSTEMS IN CONJUNCTION WITH TRANSPORTS AND/OR MOBILE DEVICES

CROSS REFERENCE TO RELATED APPLICATIONS

This application is a divisional of U.S. application Ser. No. 13/046,508, entitled, "Navigational Coordinate Systems in Conjunction with Transports and/or Mobile Devices," filed Mar. 11, 2011, which claims the benefit of U.S. Provisional Application No. 61/321,730, entitled, "Location Solution within a Cruise Ship," filed Apr. 7, 2010, both of which are assigned to the assignee hereof and are incorporated herein by reference.

BACKGROUND

1. Field

The subject matter disclosed herein relates to navigational coordinate systems in conjunction with transports and/or mobile devices.

2. Information

Navigating to a desired destination can be difficult in unfamiliar territory. To safely and accurately journey through foreign lands, people have used paper maps for centuries. More recently, electronic mapping options have become available to travelers. Web mapping services, for instance, can provide directions from a point "A" to a point "B". Like information that can be garnered from paper maps, directions acquired from web-based mapping services are relatively static. However, with the development of satellite-positioning system (SPS) technology and ever-smaller electronic devices, so-called turn-by-turn directions can now be provided dynamically as travelers journey toward their desired destination.

Unfortunately, web-based mapping services and other electronic mapping technologies usually focus on providing directions in the outdoors, such as from one postal address to another postal address. Similarly, traditional dynamic turn-by-turn directions have typically been limited to roadways. An ability to provide analogous mapping and directional services in many specific environments is currently lacking.

BRIEF DESCRIPTION OF THE FIGURES

Non-limiting and non-exhaustive aspects, features, etc. will be described with reference to the following figures, wherein like reference numerals refer to like parts throughout the various figures.

SUMMARY

Figure 1:
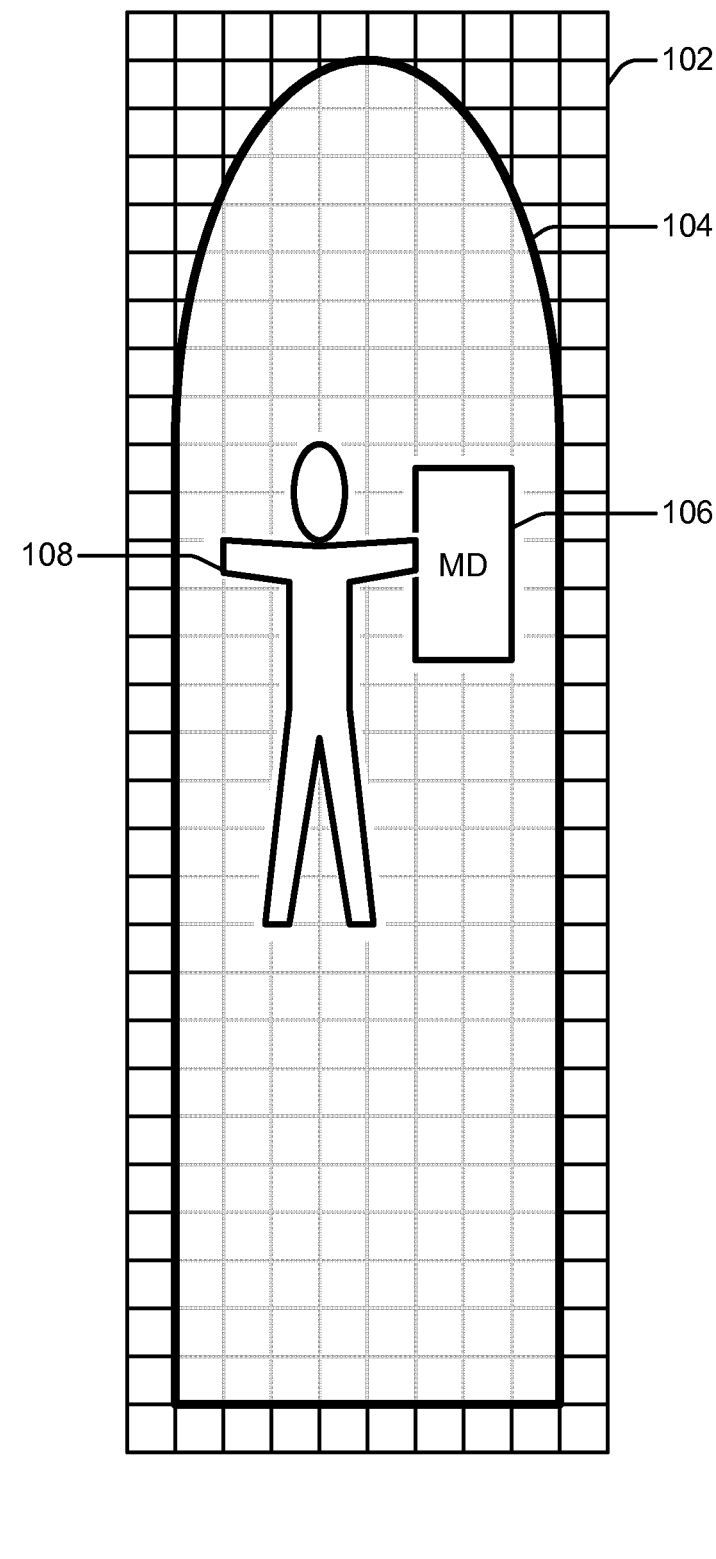
FIG. 1 is a block diagram of an example specific navigational environment that may relate to a transport and a navigational coordinate system that is associated with the transport according to an implementation.

For certain example implementations, a method by a mobile device that is at least proximate to a transport may comprise identifying a first navigational coordinate system, with the first navigational coordinate system being associated with the transport and enabling navigation within at least one navigable area of the transport. The method may also comprise identifying a second navigational coordinate system. The method may further comprise determining to utilize at least one of the first navigational coordinate system or the second navigational coordinate system based, at least in part, on one or more predetermined conditions. For certain example implementations, a mobile device may comprise at least one memory to store instructions and one or more processors configured to execute the instructions and cause the mobile device to identify a first navigational coordinate system, with the first navigational coordinate system being associated with a transport and enabling navigation within at least one navigable area of the transport. The mobile device may further be caused to identify a second navigational coordinate system and to determine to utilize at least one of the first navigational coordinate system or the second navigational coordinate system based, at least in part, on one or more predetermined conditions. For certain example implementations, an apparatus may comprise means for identifying a first navigational coordinate system, with the first navigational coordinate system being associated with a transport and enabling navigation within at least one navigable area of the transport; means for identifying a second navigational coordinate system; and means for determining to utilize at least one of the first navigational coordinate system or the second navigational coordinate system based, at least in part, on one or more predetermined conditions. For certain example implementations, an article may comprise at least one storage medium having stored thereon instructions executable by one or more processors to: identify a first navigational coordinate system, with the first navigational coordinate system being associated with a transport and enabling navigation within at least one navigable area of the transport; identify a second navigational coordinate system; and determine to utilize at least one of the first navigational coordinate system or the second navigational coordinate system based, at least in part, on one or more predetermined conditions. For certain example implementations, a method by a device that is associated with a transport may comprise identifying a first navigational coordinate system, with the first navigational coordinate system being associated with the transport and enabling navigation within at least one navigable area of the transport, and identifying a second navigational coordinate system. The method may also comprise detecting one or more predetermined conditions and determining to utilize at least one of the first navigational coordinate system or the second navigational coordinate system based, at least in part, on the one or more predetermined conditions. The method may further comprise initiating transmission, to multiple mobile devices that are at least proximate to the transport, of one or more indications that a given mobile device should utilize the first navigational coordinate system or the second navigational coordinate system based, at least in part, on the determining. It should be appreciated, however, that these are merely example implementations and that other implementations are described herein and may be implemented without deviating from claimed subject matter.

DETAILED DESCRIPTION

Reference throughout this Specification to "a feature," "one feature," "an example," "one example," and so forth means that a particular feature, structure, characteristic, aspect, etc. that is described in connection with the feature and/or example may be relevant to at least one feature and/or example of claimed subject matter. Thus, the appearances of a phrase such as "in one example," "an example," "in one feature," "a feature," "in an example implementation," "for certain example implementations," and so forth in various places throughout this Specification are not necessarily all referring to the same feature, example, and/or example implementation. Furthermore, the particular features, examples, structures, characteristics, aspects, etc. may be combined in one or more example methods, example systems, other example implementations, and so forth.

As indicated above, some mapping and other navigational-related services are available in outdoor environments, which present a relatively static domain on which to enable directional capabilities. A global positioning system (GPS) or other satellite positioning system (SPS), for example, can enable navigation services for mobile devices in outdoor environments. Because satellite signals may not be reliably received and/or acquired in an indoor environment, different techniques may be employed to enable navigation services in a specific environment such as the indoors, which is often stable and thus also presents a relatively static domain on which to enable directional capabilities. For instance, mobile devices can typically obtain a position fix by measuring ranges to multiple (e.g., three or more) terrestrial wireless access points (APs) or other transceiver devices that are positioned at known locations. Such ranges may be measured, for example, by obtaining a media access control identifier (MAC ID) address from signals received from APs and measuring one or more characteristics of signals received from such APs. Such signal characteristics may include, by way of example but not limitation, received signal strength indicator (RSSI), round-trip time (RTT), and so forth.

In some implementations and/or circumstances, an indoor navigation system may provide a digital electronic map to mobile devices as they enter a particular indoor area. Such a map may show indoor features such as particular zones (e.g., rooms, hallways, entryways, cubicles/booths, stores, terminals, etc.), doors, walls, stairs, elevators, and so forth, as well as points of interest (POIs) such as bathrooms, pay phones/data services, room names, store names, and so forth. Such a digital electronic map may be stored at a server and made accessible to a mobile device via a universal resource locator (URL) or similar addressable location, for example. By obtaining and displaying such a map, a mobile device may overlay a current location of the mobile device (and associated user) and/or POIs onto the displayed map to provide a user with additional context. Using a current position of a mobile device, the mobile device may be capable of providing static and/or dynamic navigational instructions over a route from one location (e.g., a current or other identified location) to a designated destination in an indoor space.

An example of an indoor or other specialized space is that of a transport, which may present a dynamic domain that significantly impacts the provisioning of directional capabilities. A transport may comprise, for example, a movable structure that is adapted to carry or otherwise transport people and/or other physical things. Transports may include, but are not limited to, vessels, planes, trains, ships, combinations thereof, and so forth, including those positioning domains generally that may be relatively dynamic, at least with regard to another navigational coordinate system. Many transportation carriers have begun providing to their passengers wireless local area network (WLAN) service (e.g., for a connection to the Internet) to enhance the traveling experience. For example, WLAN service is common on trains and ocean liners, and it is gradually being expanded onto airline flights. Navigation systems for transports (e.g., transportation vessels) may further enhance the traveling experience in both onboard navigation and ship-to-shore/shore-to-ship contexts.

Large cruise ships, for instance, may typically carry over 2000 passengers and 1000 crew members. Many large cruise ships may have over a dozen stories of navigable indoor space. Additionally, some are so immense that it can take a passenger five to ten minutes to walk from bow to stern. Finding particular locations and/or points of interest can be challenging, especially for passengers who are new to cruising.

There are certain challenges to effectively providing navigation assistance or other location-based services (LBS) for navigable areas (e.g., indoor, surface, etc. spaces) of a transport vessel (e.g., train, plane, ship, etc.) using a digital map. For example, there are certain challenges to integrating a local navigational coordinate system with a global navigational coordinate system. Additionally, presentation to a user of a digital map for assisting navigation is more challenging because a transport's orientation may change relative to a true or magnetic North of a global navigational coordinate system as well as the transport's actual orientation may change on the global navigational coordinate system.

As introduced above, while onboard a large ocean liner, a passenger may desire that navigational instructions be provided via directional instructions and/or a digital map (e.g., that is served to a mobile device through a Wi-Fi AP or other transmitter associated with the vessel, that is served to a mobile device through a cellular and/or wireless wide area network (WWAN), that is provided to a mobile device by pre-downloading it, etc.). Additionally, a cruise ship passenger may desire navigational assistance (e.g., via a digital map displayed on a mobile device) for areas that are on land but that are close to a port when a cruise ship is docked. In such a context, a digital map of area(s) of a cruise ship (e.g., internal and/or surface areas of a ship) may be provided according to a "local navigational coordinate system," and a digital map of areas around a docking point at a port may be provided according to a "global navigational coordinate system" (e.g., provided according to earth-centered coordinates). In an example implementation, there may be a desire under certain predetermined condition(s) to utilize a local navigational coordinate system, a global navigational coordinate system, or both. For example, if a cruise ship is moving through an ocean away from a shore, there may be no need for mapping information related to points of interest on land, even those near a given port. Accordingly, mapping information for a local navigational coordinate system (e.g., for navigable areas on a cruise ship) may be provided while mapping information for land-based points of interest may be omitted during such times.

Hence, while on a movable transport, a passenger may desire from time to time to utilize a local navigational coordinate system, a global navigational coordinate system, or both. If a transport is moving between ports (e.g., such as a cruise ship sailing on an ocean away from land), a passenger may merely want to employ a local navigational coordinate system. A passenger's display of a navigational map on a mobile device may therefore be zoomed-in to focus on map features of portion(s) of a transport. If a transport is docked at port, on the other hand, a passenger may desire to employ a global navigational coordinate system in lieu of or in addition to a local navigational coordinate system as evidenced by a zoomed-out condition of a map. Thus, a passenger's display of a navigational map on a mobile device may be zoomed-out to include map features showing points of interest on land in an area around the port. In such an example implementation, a passenger may be enabled to seamlessly navigate from ship to shore; locate and navigate to points of interest within walking distance, such as restaurants, cultural attractions, shops, etc.; and return from the shore to the ship by following navigational instructions presented on a mobile device.

According to an example implementation, a mobile device may automatically detect or ascertain one or more predetermined conditions with regard to determining to utilize at least one of a global navigational coordinate system (e.g., in lieu of or in addition to a local navigational coordinate system) or a local navigational coordinate system (e.g., in lieu of or in addition to a global navigational coordinate system). For example, a passenger's mobile device may obtain one or more messages (e.g., may obtain one or more signals containing such a message or messages) from a location server present on a ship, with the message indicating that a global navigational coordinate system is to be utilized. Alternatively, such a mobile device may ascertain at least one satellite-based position fix indicating that a ship is docked in a particular port. In another alternative, a mobile device may detect through inertial sensors whether a ship is at port or at sea via an association with known pattern(s) to one or more signals indicating movement as detected by the inertial sensors. With these example alternatives, if a mobile device deduces that it is present at a port and/or is stationary, the mobile device may determine to utilize at least a global navigational coordinate system. In yet another alternative, a mobile device may receive user input implying a relevant context to determine to utilize at least a global navigational coordinate system. For instance, selection to zoom-in on local features may imply an interest primarily in ship-board navigation, and selection to zoom-out to display areas surrounding a transport may imply an interest in off-ship navigation. Additional example implementations relating to determining at least one navigational coordinate system to utilize (e.g., for navigational-related operations) are described herein.

According to an example implementation, upon the docking of a ship at a port, ship-to-shore and shore-to-ship navigation may be facilitated. For example, a local navigational coordinate system may be aligned with or otherwise linked to a global navigational coordinate system to enable corresponding maps of each to be seamlessly displayed together on a mobile device. One or more first coordinates defined according to a first navigational coordinate system may be matched to a corresponding one or more second coordinates defined according to a second navigational coordinate system. With aligned navigational coordinate systems, a path may be routed between a first point on a ship and a second point on a shore. Such a route may be presented, for example, to a user of a mobile device for navigational purposes.

According to an example implementation, while a ship is docked at a port, a local navigational coordinate system may move relative to a global navigational coordinate system due to any one of several phenomena. For example, while a ship is docked at port, entry and exit ramps may be on any of multiple (e.g., two, three, four, etc.) different floors depending on the tide, current payload, combinations thereof, and so forth. These ramps may be moved throughout the day as a ship moves vertically relative to a dock. Changing a floor to which or from which a ramp leads may cause confusion for a passenger that leaves the ship from one floor and returns to the ship on another floor using the same ramp. To provide a mechanism for seamlessly navigating from ship to shore and back again, a mobile device may receive updates from a location server through a wireless message to reflect any relevant routing changes arising from changes in the positional locations of entry and exit points to the dock. A navigational system is thus able to accurately route individuals between points of interest on a local navigational coordinate system (e.g., for a ship) and points of interest on a global navigational coordinate system (e.g., for on-shore areas around a port). A user of a mobile device may request delivery of, for instance, push notifications to receive notice of adjustments to entry and exit points as tides and payloads change. Receiving dynamic updates at mobile devices may also enable a shipboard navigation system to route passengers away from congested areas at certain times (e.g., away from a deck near a theater at the beginning or ending of a show). Here, an algorithm may route passengers away from heavily congested areas by providing directions or other instructions to follow a path that avoids a congested area.

According to an example implementation, as described above, a passenger's mobile device may display a navigational map of an interior portion of a transportation vessel according to a local coordinate system. Like with indoor navigation systems for fixed buildings, it may be desirable to orient a display of the navigational map to be consistent with indoor features (e.g., wall angles, door locations, etc.). Orienting such a map display with actual indoor features allows a user to easily follow routing instructions along a routing graph or path that is shown on a displayed map. A mobile device may include magnetometers and/or other sensors that are capable of sensing North (e.g., to determine true and/or magnetic North) regardless of an orientation of a mobile device. Accordingly, such a mobile device can orient a displayed indoor map to match actual indoor features if the navigational map has an indication of North included therewith.

On the other hand, unlike a fixed building having indoor features that are fixed relative to North, a transport may not maintain a constant heading. Its overall physical orientation as well as its heading may therefore change relative to North. Consequently, merely being able to determine a Northerly direction may not enable a display of a digital map in alignment with actual features of an interior of a transport. In an example implementation, a mobile device may receive a transport's heading/direction information (e.g., relative to North as determined by the transport's navigational system). A mobile device may receive such heading information from a shipboard location server via a Wi-Fi AP, for example, when a heading changes or periodically. With knowledge of a transport's heading relative to North and a direction of North as ascertained using a magnetometer, a mobile device can properly orient a navigational map display relative to actual interior features of the transport and a current orientation of the mobile device.

In an example implementation, a ship's compass system may be used to determine north. As the ship's direction of motion is updated, an annotation layer (e.g., a "map alignment" layer) may be updated. Such an annotation layer may contain, for example, a line segment defining a head and tail of an arrow pointing north. If the ship turns, the x,y coordinates of the head of the arrow keeps changing. A mobile device may keep downloading this arrow coordinate periodically, or such information may be pushed when the ship turns. Given a mobile device's current direction reading from its own compass, a map with such an alignment annotation layer can be rotated so that it is oriented for a user to match the ship's real-world features.

According to an example implementation, a ship-board navigation system may assist in routing passengers in the event of an emergency. Even if there are sufficient lifeboats to receive all passengers safely, the crew may need to distribute thousands of panicking passengers among appropriate evacuation decks. Cruise ships typically instruct passengers to go to a particular evacuation point based upon a location of passengers' rooms on a given deck. This procedure may be impractical if a particular emergency event (e.g., a fire) makes it impossible for some passengers to access a particular evacuation point. Instead, in an example implementation, passengers may use their mobile devices to receive routing instructions to evacuate to a particular evacuation point based upon real-time information.

By way of example only, such routing instructions may be based, at least in part, on: a location of an emergency event, a nature of the emergency event, locations of multiple ones of the passengers, a combination thereof, and so forth. A nature of an emergency event may be determined or defined at least in part by: whether passengers need to evacuate a transport and/or whether merely moving passengers to another part of the ship is sufficient to take passengers out of harm's way, just to name a couple of examples. It should be understood, however, that claimed subject matter is not limited to any of these particular example implementations. Moreover, additional example implementations are described further herein below.

FIG. 1 is a block diagram of an example specific navigational environment 100 that may relate to a transport 104 and a navigational coordinate system 102 that is associated with the transport according to an implementation. As illustrated, specific navigational environment 100 may include navigational coordinate system 102, at least one transport 104, one or more mobile devices 106, and one or more users 108. For certain example implementations, navigational coordinate system 102 may be associated with transport 104. Navigational coordinate system 102 may enable navigation within at least one navigable area of transport 104. Navigational coordinate system 102 may be smaller than, co-extensive with, or larger than an associated transport 104. Similarly, navigational coordinate system 102 may cover more, all, or less than an entirety of a transport 104.

In an example implementation, a transport 104 may include one or more navigable areas (not separately shown). A navigable area may include, by way of example but not limitation, any area of a transport (e.g., in an interior and/or on a surface thereof) that is accessible by a person. Decks, hallways, walkways, rooms, galleys, theatres, kitchens, shops, dining rooms, bathrooms, seating areas, elevators, stairs, storage compartments, crew areas, bars, etc., just to name a few examples, may individually or jointly comprise one or more navigable areas of a transport. A user 108 may comprise, for example, a person that is associated with at least one mobile device 106. A user 108 that is located on, proximate to, and/or otherwise affiliated with a transport 104 (e.g., by virtue of being booked, scheduled, etc. to be located on such a transport 104) may be considered a passenger thereof. Examples of mobile devices 106 are described further herein below with particular reference to FIGS. 9 and 20.

Figure 2:
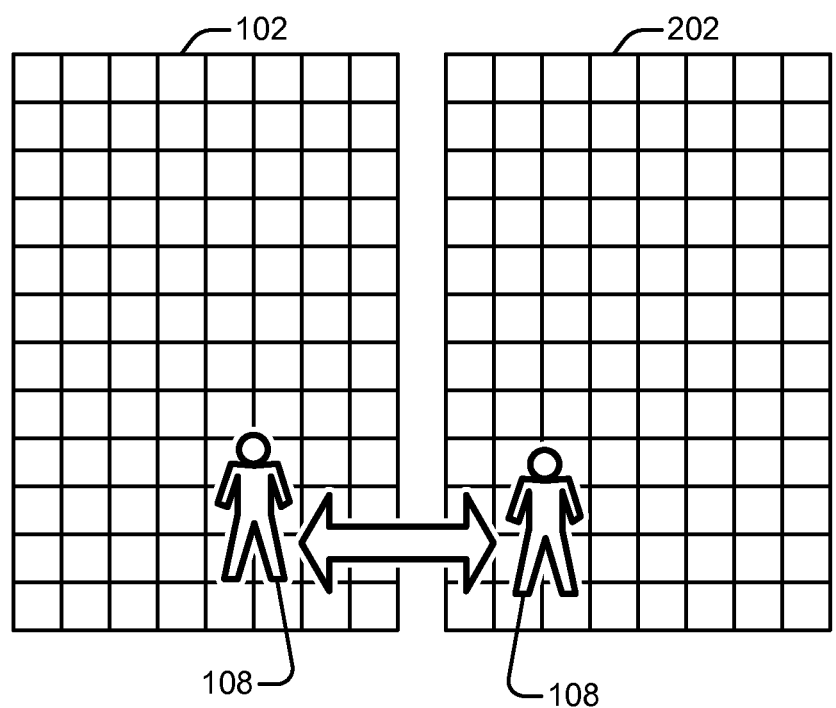
FIG. 2 is a schematic diagram of an example navigational environment that may include a first navigational coordinate system and a second navigational coordinate system according to an implementation.

FIG. 2 is a schematic diagram of an example navigational environment 200 that may include a first navigational coordinate system 102 and a second navigational coordinate system 202 according to an implementation. As illustrated, example navigational environment 200 may include first navigational coordinate system 102 and second navigational coordinate system 202 along with one or more users 108. For certain example implementations, a user 108 may be traveling and/or plan to be traveling between two or more locations that are associated with different navigational coordinate systems. Accordingly, a first navigational coordinate system 102 may be identified, and a second navigational coordinate system 202 may be identified. In an example implementation, first navigational coordinate system 102 and second navigational coordinate system 202 may be capable of moving relative to each other. For instance, one navigational coordinate system may be associated with a relatively mobile structure, such as transport, and another navigational coordinate system may be associated with a relatively static structure or entity, such as land or a building.

As described in examples provided herein above, a user 108 may be moving from land to a transport. In a given situation, it may be preferable to utilize a particular navigational coordinate system over another alternative navigational coordinate system. In another given situation, it may be preferable to utilize multiple navigational coordinate systems. For example, it may be preferable for a user 108 that is located on a transport away from a port to utilize a first navigational coordinate system 102. On the other hand, it may be preferable for a user 108 that is located on land and not intending to proceed to a transport to utilize a second navigational coordinate system 202. Furthermore, it may be preferable for a user 108 that is traveling from a transport to land while the transport is at a port to utilize both a first navigational coordinate system 102 and a second navigational coordinate system 202. An aptly configured mobile device may determine to utilize at least one of a first navigational coordinate system 102 or a second navigational coordinate system 202 (including potentially both a first and a second navigational coordinate system), for example based at least partly on one or more predetermined conditions. Examples of such predetermined conditions are described further herein below.

Figure 3:
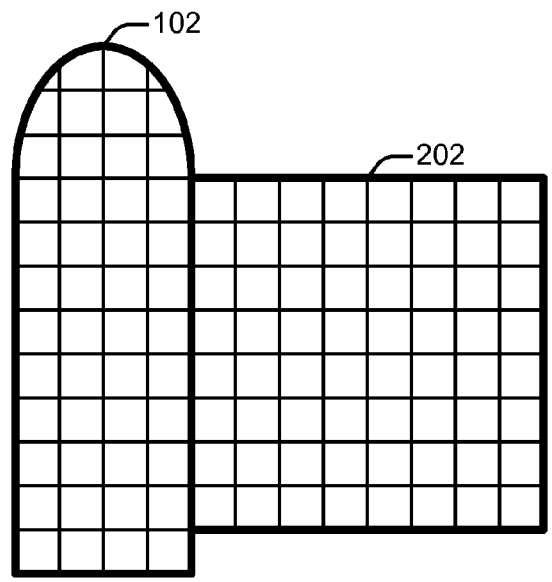
FIG. 3 is a schematic diagram of example realizations for a first navigational coordinate system and a second navigational coordinate system according to an implementation.

FIG. 3 is a schematic diagram 300 of example realizations for a first navigational coordinate system 102 and a second navigational coordinate system 202 according to an implementation. For certain example implementations, a first navigational coordinate system 102 may be associated with a transport, and a second navigational coordinate system 202 may be associated with a relatively stationary structure or entity (e.g., a building, a dock, a port area, land, combinations thereof, etc.). Alternatively, second navigational coordinate system 202 may also be associated with a relatively mobile structure, such as another transport. As shown by way of example in schematic diagram 300, second navigational coordinate system 202 may comprise a local navigational coordinate system that is referenced to a building structure and that enables navigation within the building structure. Alternatively, second navigational coordinate system 202 may also be associated with and referenced to a relatively mobile structure, such as another transport, to enable navigation therewith.

Figure 4:
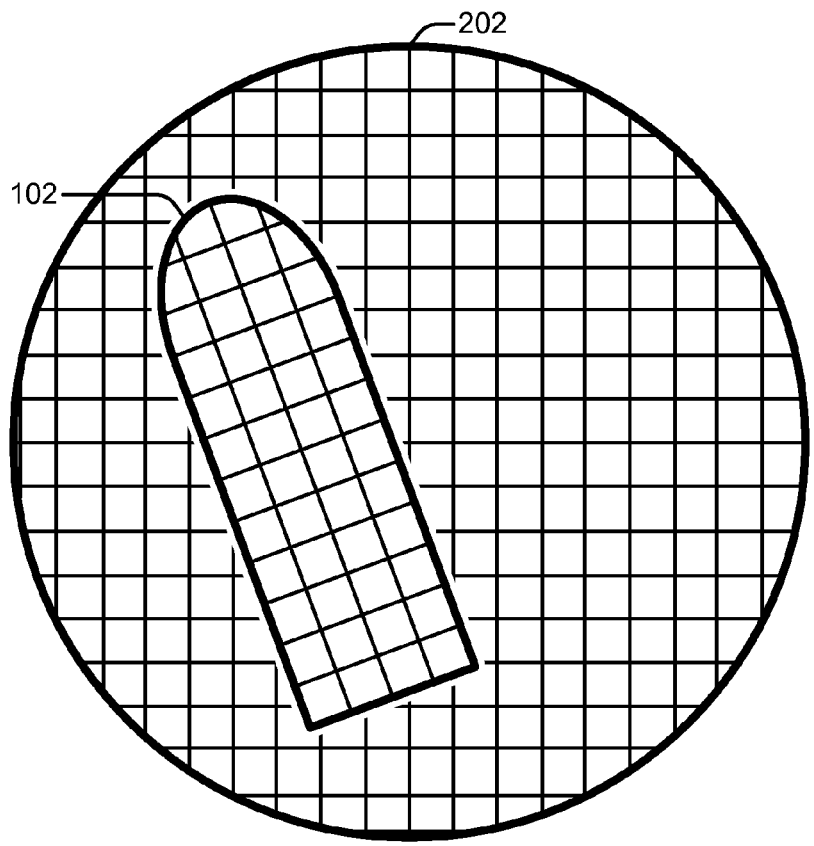
FIG. 4 is a schematic diagram of other example realizations for a first navigational coordinate system and a second navigational coordinate system according to an implementation.

FIG. 4 is a schematic diagram 400 of other example realizations for a first navigational coordinate system 102 and a second navigational coordinate system 202 according to an implementation. As shown by way of example in schematic diagram 400, second navigational coordinate system 202 may comprise a global navigational coordinate system that is referenced to an earth-centered coordinate system, e.g. for the earth. In an example implementation, a transport that is associated with first navigational coordinate system 102 may be capable of changing location on a global navigational coordinate system. A global navigational coordinate system may enable navigation around a dock, a port area, land, some combination thereof, and so forth, just to name a few examples.

Figure 5:
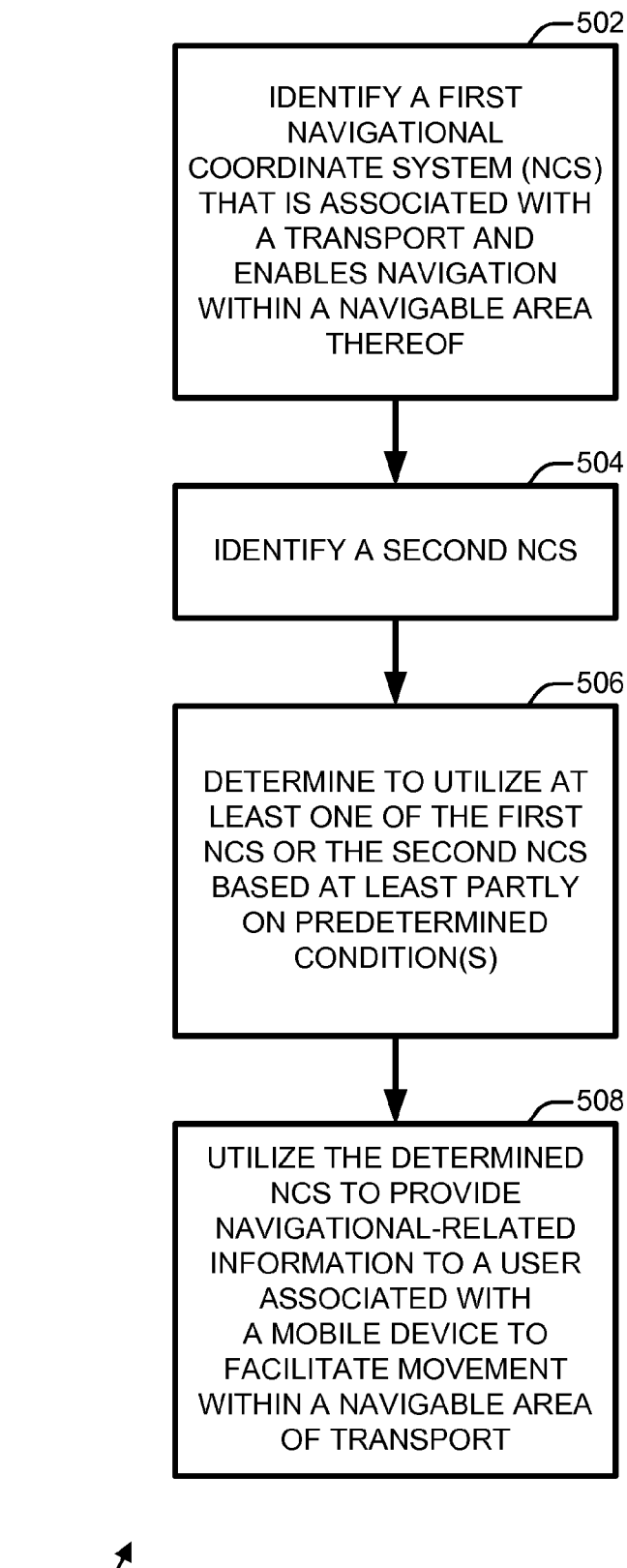
FIG. 5 is a flow diagram illustrating an example method for determining a navigational coordinate system to be utilized by a mobile device from a perspective of the mobile device according to an implementation.

FIG. 5 is a flow diagram 500 illustrating an example method for determining a navigational coordinate system to be utilized by a mobile device from a perspective of the mobile device according to an implementation. As illustrated, flow diagram 500 may include four operational blocks 502-508. Although operations 502-508 are shown and described in a particular order, it should be understood that methods may be performed in alternative manners (including with a different order and/or number of operations) without departing from claimed subject matter. Also, at least some operations of flow diagram 500 may be performed so as to be fully or partially overlapping with other operation(s). Additionally, although the description below references particular aspects and features illustrated in certain other figures, methods may be performed with other aspects and/or features.

For certain example implementations, operations 502-508 may be performed at least partially by at least one mobile device 106 that is at least proximate to (e.g., located on, within wireless communication of, etc.) a transport 104. At operation 502, a first navigational coordinate system may be identified, with the first navigational coordinate system being associated with a transport and enabling navigation within a navigable area of the transport. For example, a first navigational coordinate system 102 may be identified, with first navigational coordinate system 102 being associated with a transport 104 and enabling navigation within a navigable area of transport 104.

At operation 504, a second navigational coordinate system may be identified. For example, a second navigational coordinate system 202 may be identified. Navigational coordinate systems (e.g., 102 and/or 202) may be identified using any one or more of multiple example approaches. Such example approaches include, but are not limited to, the following individually and/or in any combination. A navigational coordinate system may be identified by tagging it. One may be identified by detecting a label or other indication in association with a navigational coordinate system. A navigational coordinate system may be identified by receiving it and/or an indication thereof (e.g., from an external source such as a wireless access device fixed to a transport, from an SPS, etc.). One may be identified by accessing a default navigational coordinate system and/or indication thereof (e.g., a global navigational coordinate system may be a default navigational coordinate system). A navigational coordinate system may be identified by retrieving at least a portion of it from memory. Also, a navigational coordinate system may be identified by processing (e.g., modifying, compressing, analyzing, excising a portion of, etc.) a navigational coordinate system. However, claimed subject matter is not limited to these specific examples.

At operation 506, it may be determined to utilize at least one of the first navigational coordinate system or the second navigational coordinate system based, at least in part, on one or more predetermined conditions. For example, a mobile device 106 may determine to utilize at least one of first navigational coordinate system 102 or second navigational coordinate system 202 based, at least in part, on one or more predetermined conditions. One or more predetermined conditions may include, by way of example but not limitation, obtainment of a signal via a transmitter fixed to a transport, detection of sensor data matching transport movement, obtainment of user input indicating a map portion preference, and so forth.

At operation 508, the at least one determined navigational coordinate system may be utilized to provide navigational-related information to a user associated with the mobile device to facilitate movement of the user within the navigable area of the transport. For example, at least one determined navigational coordinate system 102 and/or 202 may be utilized to provide navigational-related information to a user 108 associated with a mobile device 106 to facilitate movement of user 108 within at least one navigable area of a transport 104.

Navigational-related information may comprise, by way of example but not limitation, any information that can potentially aid navigation around an area, aid navigation from a given point of origin to a desired destination, combinations thereof, and so forth, just to name a few examples. Navigational-related information may include, but is not limited to, mapping information, routing/connectivity/routability information, static and/or dynamic directions, annotation information (e.g., points of interest information, feasible area information, etc.) for a map, positioning information, location-based service (LBS) information, some combination thereof, and so forth. Mapping information may comprise, for example, lines, geometric shapes, and/or other data enabling a device to render a map for a given area to depict, for example, rooms, walls, hallways, points of ingress/egress, points of interest, buildings, roadways, and so forth, just to name a few examples. Mapping information may further comprise a connectivity graph and/or a routing graph. Mapping information for a cruise ship, by way of example only, may also represent the presence of multiple floors, as well as feasible paths between and/or among different floors. Annotation information for a cruise ship, by way of example only, may reflect that such a ship may resemble a small city on water, with its own thoroughfares, city squares, shortcuts, and points of attraction. Shipboard mapping annotation information may therefore provide a rich array of dynamic information that may be used to augment indoor location-based services.

Routability information may comprise, for example, information that is capable of aiding and/or facilitating a determination of a route. By way of example but not limitation, routability information may include any one or more of the following: a connectivity graph, a routing graph, annotation information (e.g., that is coupled to a routing graph), general localized environment information, indication(s) of feasible and infeasible areas, indications of traversable paths, any combination thereof, and so forth, just to name a few examples. However, claimed subject matter is not so limited to these specific examples of navigational-related information, mapping information, annotation information, or routability information.

Figure 6:
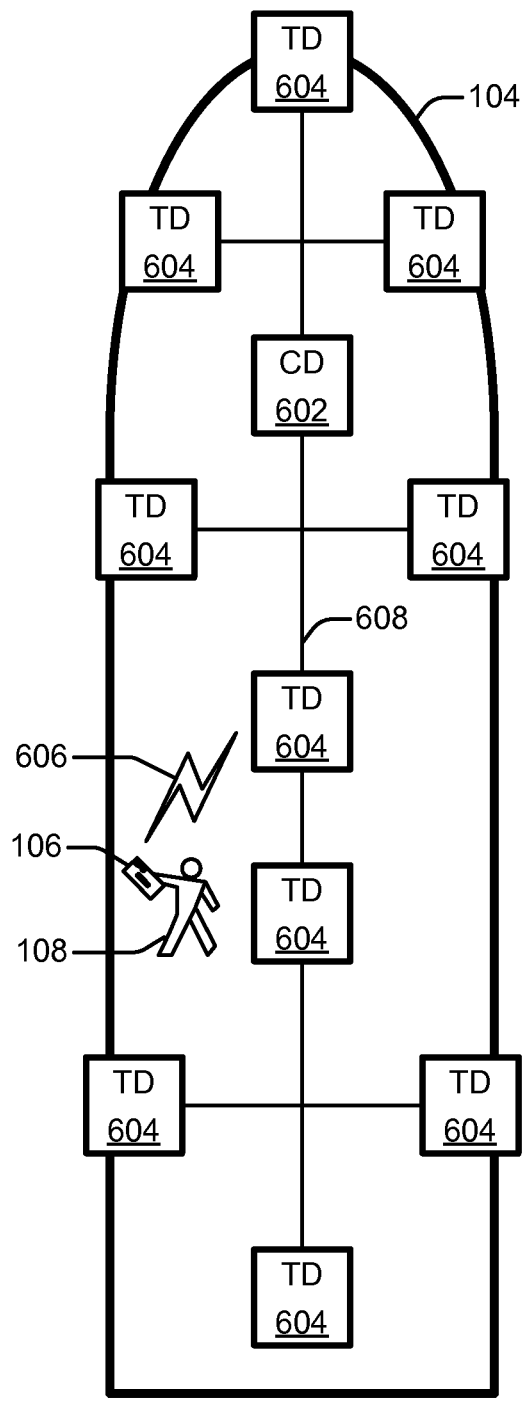
FIG. 6 is a schematic diagram of an example transport that includes a control device and multiple transmitter devices according to an implementation.

FIG. 6 is a schematic diagram 600 of an example transport 104 that includes a control device 602 and multiple transmitter devices 604 according to an implementation. As illustrated, schematic diagram 600 depicts a transport 104 that includes at least one control device (CD) 602 and that has one or more transmitter devices (TD) 604 affixed thereto. Schematic diagram 600 also depicts a user 108, which is associated with a mobile device 106, a wireless communication signal 606, and a wired network 608.

For certain example implementations, control device 602 may be in wired communication with multiple transmitter devices 604, such as over at least one wired network 608 (e.g., a local area network LAN)). Additionally and/or alternatively, control device 602 may be in wireless communication with multiple transmitter devices 604, such as over a wireless network (e.g., a wireless LAN (WLAN)) (not explicitly shown in FIG. 6). Transmitter devices 604 may be fixed to transport 104 strategically so that a desired portion or portions of transport 104 over one or more decks or other levels offers satisfactory wireless communication coverage. However, claimed subject matter is not limited to any particular number or arrangement of transmitter devices 604, any particular wireless coverage, and/or any particular configuration of a network for control device 602 and transmitter devices 604. Wireless communication signal 606 may involve a communication signal transmitted from a transmitter device 604 to a mobile device 106 and/or a communication signal transmitted from a mobile device 106 to a transmitter device 604.

Figure 7:
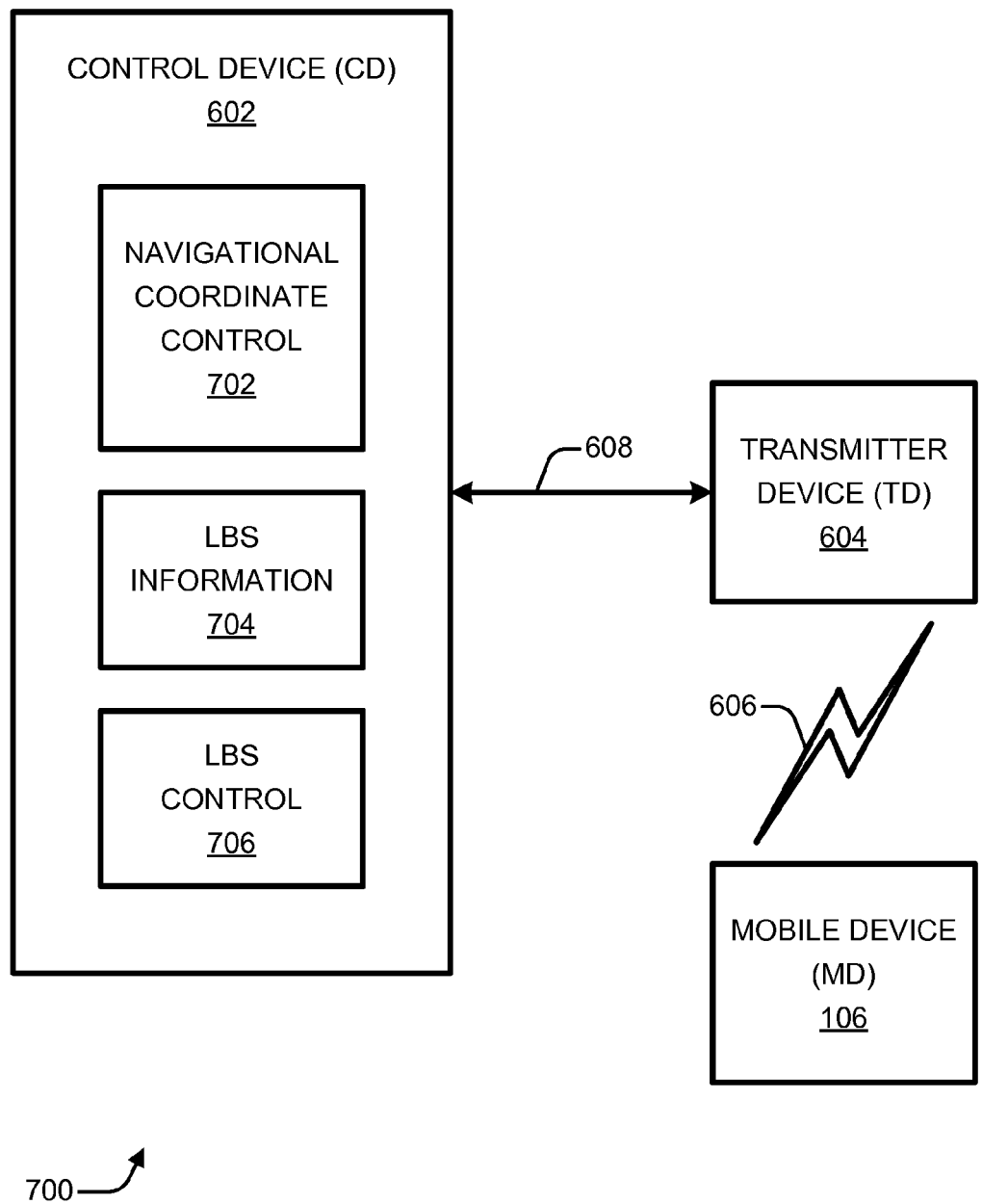
FIG. 7 is a schematic diagram of an example communication exchange scenario between and/or among a control device, a transmitter device, and/or a mobile device according to an implementation.

FIG. 7 is a schematic diagram 700 of an example communication exchange scenario between and/or among a control device 602, a transmitter device 604, and/or a mobile device 106 according to an implementation. As illustrated, schematic diagram 700 may include at least one control device 602, one or more transmitter devices 604, and at least one mobile device 106, as well as a wired network 608 and at least one wireless communication signal 606. Control device 602 may include navigational coordinate control 702, location-based services (LBS) information 704, and/or location-based services (LBS) control 706.

For certain example implementations, a control device 602 may be realized as a special-purpose computing device, such as a server computer that has been programmed with instructions to perform one or more features and/or functionality that is described herein. Example implementations for a control device 602 are described further herein below with particular reference to FIG. 20. Navigational coordinate control 702 may comprise logic to implement functions described herein that pertain to selectively determining whether to utilize a first or a second navigational coordinate system. Location-based services information 704 may comprise information that is acquired, processed, disseminated, etc. to perform functions that are described herein. Location-based services information 704 may comprise, by way of example but not limitation, navigational-related information, including that which is tied to a given location of a mobile device and/or a transport. Location-based services control 706 may comprise logic to implement functions described herein that pertain to utilizing a selected at least one navigational coordinate system. Although shown separately, navigational coordinate control 702, location-based services information 704, and/or location-based services control 706 may be implemented jointly or in other arrangements. Furthermore, navigational coordinate control 702, location-based services information 704, and/or location-based services control 706 may be implemented as two or more separate devices.

Location-based services may include, but are not limited to, the providing of navigational information. For example, point-of-interest information, a connectivity graph, a routing graph, turn-by-turn directional instructions, "static" directions from one location to another location, map-relating searching functionality, etc. may be provided. Other examples of location-based services may include, but are not limited to, routing, positioning, position filtering, navigation, incentives applications (e.g., offers based on location), location-based search, combinations thereof, and so forth. Navigational-related information or other information related to a location-based service (LBS) may be provided by presenting it to a user (e.g., visually, haptically, and/or aurally via a mobile device), by transmitting it to a mobile device, some combination thereof, and so forth, just to enumerate a few examples.

A transmitter device 604 may be realized, by way of example only, separately, in conjunction with a receiver, as part of a transceiver, and so forth. A transmitter device 604 may comprise all or part of a Wi-Fi AP or, more generally, a wireless access device (not explicitly shown). A wireless access device may provide access to information wirelessly and/or enable wireless communication signals 606 to be transmitted and/or received. In example implementations, a wireless access device may comprise a Wi-Fi and/or WLAN AP, a femtocell nodal device, a WiMAX nodal device, a Bluetooth or other similarly short-ranged wireless node, a pseudolite, and so forth, just to name a few examples. Wireless access devices may transmit signals including wireless access device identifiers and/or messages. However, claimed subject matter is not limited to any particular implementation of wireless access device(s).

Figure 8:
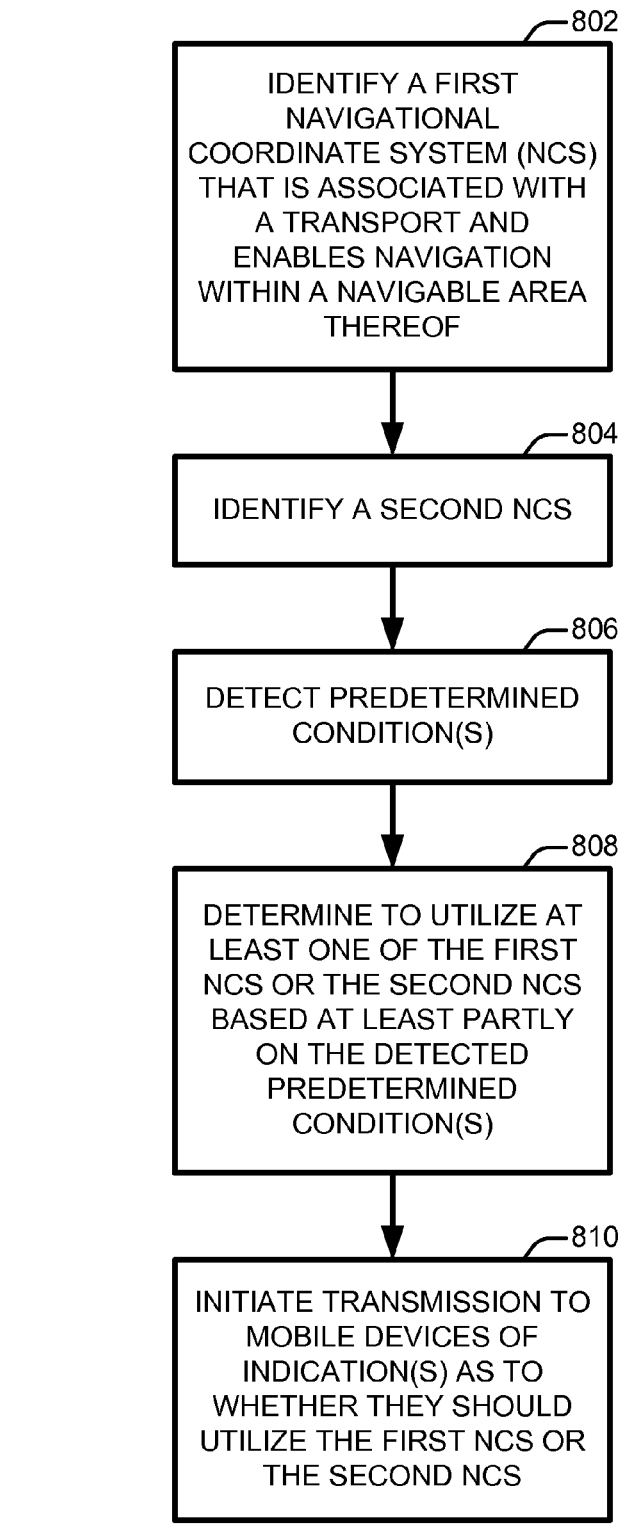
FIG. 8 is a flow diagram illustrating an example method for determining a navigational coordinate system to be utilized by a mobile device from a perspective of a transport according to an implementation.

FIG. 8 is a flow diagram 800 illustrating an example method for determining a navigational coordinate system to be utilized by a mobile device from a perspective of a transport according to an implementation. As illustrated, flow diagram 800 may include five operational blocks 802-810. Although operations 802-810 are shown and described in a particular order, it should be understood that methods may be performed in alternative manners (including with a different order and/or number of operations) without departing from claimed subject matter. Also, at least some operations of flow diagram 800 may be performed so as to be fully or partially overlapping with other operation(s). Additionally, although the description below references particular aspects and features illustrated in certain other figures, methods may be performed with other aspects and/or features.

For certain example implementations, operations 802-810 may be performed at least partially by at least one control device 602 that is located at or otherwise associated with a transport 104. At operation 802, a first navigational coordinate system may be identified, with the first navigational coordinate system being associated with a transport and enabling navigation within a navigable area of the transport. For example, a first navigational coordinate system 102 may be identified, with first navigational coordinate system 102 being associated with a transport 104 and enabling navigation within a navigable area of transport 104.

At operation 804, a second navigational coordinate system may be identified. For example, a second navigational coordinate system 202 may be identified. At operation 806, one or more predetermined conditions may be detected. Examples of such predetermined condition(s) are described herein below. At operation 808, it may be determined to utilize at least one of the first navigational coordinate system or the second navigational coordinate system based, at least in part, on the one or more predetermined conditions. For example, a control device 602 may determine that at least one of first navigational coordinate system 102 or second navigational coordinate system 202 should be utilized based, at least in part, on the one or more predetermined conditions.

At operation 810, transmission may be initiated, to multiple mobile devices that are at least proximate to the transport, of one or more indications as to whether a given mobile device should utilize the first navigational coordinate system or the second navigational coordinate system (including indication(s) to use either one or both coordinate systems) based, at least in part, on the determining. For example, control device 602 may initiate transmission (e.g., via one or more transmitter devices 604), to multiple mobile devices 106 that are at least proximate to transport 104, of one or more indications as to whether a given mobile device 106 should utilize first navigational coordinate system 102 or second navigational coordinate system 202 (e.g., indication(s) to utilize first navigational coordinate system 102, second navigational coordinate system 202, both first navigational coordinate system 102 and second navigational coordinate system 202, etc.) based, at least in part, on the determination.

For certain example implementations, information relating to navigation with a mobile device with respect to a transport may change from time to time. Hence, it may be determined that at least a portion of annotation information that is associated with mapping information for a transport has changed. If so, transmission may be initiated, to multiple mobile devices that are at least proximate to the transport, of updated annotation information responsive to the determination that the at least a portion of the annotation information has changed.

For certain example implementations, a user may wish to travel from a transport to land, to a building structure, to another transport, or vice versa (e.g., a user may wish to board or disembark from a transport). Hence, it may be determined that a transport is substantially stationary at a port. If so, a navigational coordinate system determination may include determining to utilize a first navigational coordinate system and a second navigational coordinate system based, at least in part, on the determination that the transport is substantially stationary at the port. Transmission may be initiated, to multiple mobile devices that are at least proximate to the transport, of one or more indications that indicate to a given mobile device to utilize the first navigational coordinate system and the second navigational coordinate system by linking the first navigational coordinate system and the second navigational coordinate system such that a first map associated with the first navigational coordinate system may be seamlessly displayed with a second map associated with the second navigational coordinate system at the given mobile device. Additional related example implementations, including those that pertain to mobile devices, are described further herein below with particular reference to FIGS. 10 and 11.

In example implementations, a first navigational coordinate system and a second navigational coordinate system may be "stitched" together using corresponding coordinate(s) that are known in each navigational coordinate system. Hence, one or more second coordinates may be obtained that are defined according to a second navigational coordinate system, with the one or more second coordinates corresponding to one or more first coordinates that are defined according to a first navigational coordinate system. Transmission may be initiated, to multiple mobile devices that are at least proximate to a transport, of at least the one or more second coordinates to enable the first navigational coordinate system and the second navigational coordinate system to be linked such that a first map associated with the first navigational coordinate system may be seamlessly displayed with a second map associated with the second navigational coordinate system by at least a portion of the multiple mobile devices. Additional related example implementations, including those that pertain to mobile devices, are described further herein below with particular reference to FIG. 12 (as well as FIGS. 10 and 11).

For certain example implementations, one or more events may affect routability information. For example, an entertainment show may create congestion at one area of a ship or a ship may move relative to a dock. As another example, it may be determined that an undesirable (e.g., due to weather, crew-only designation, etc.) and/or unsafe part of a ship should be avoided. Routing instructions may therefore be adjusted to accommodate such events. For instance, passengers may be routed around crowded areas at particular/scheduled times, and currently feasible paths may be identified. Congestion may be known based on a schedule of activities, past history, inferred by the presence of a large number of mobile devices at any location, some combination thereof, and so forth, just to name a few examples. A routing algorithm on mobile devices can be updated regularly and/or as relevant with any such information, allowing an associated user to avoid such areas.

Hence, it may be determined that at least one event has affected routability information for a transport. Updated routing information may be obtained based, at least in part, on the at least one event. Transmission may be initiated, to at least a subset of multiple mobile devices that are at least proximate to the transport, of the updated routing information to accommodate the at least one event. In example implementations, the at least one event may comprise a change in elevation of the transport relative to land due to tidal changes, and the routability information may be affected with respect to at least one point of ingress and/or egress because of the change in the elevation of the transport. Additional related example implementations, including those that pertain to mobile devices, are described further herein below with particular reference to FIGS. 13 and 14.

For certain example implementations, a passenger of a transport may prefer to see a map of the transport that is displayed on an associated mobile device such that it is oriented to reflect an orientation of the transport. Hence, at least one heading of a transport relative to at least one reference datum may be obtained. Transmission may be initiated, to multiple mobile devices that are at least proximate to the transport, of one or more signals representative of the at least one heading of the transport relative to the at least one reference datum. A reference datum may be, for instance, true or magnetic north. Additional related example implementations, including those that pertain to mobile devices, are described further herein below with particular reference to FIGS. 15-17.

For certain example implementations, an emergency situation may impact desired passenger traffic patterns, including potentially evacuation paths. Hence, at least an approximate location of an emergency situation at a transport may be obtained. An evacuation plan for at least a portion of passengers of the transport may be obtained, with the evacuation plan being based at least partly on the approximate location of the emergency situation. Transmission may be initiated, to at least a subset of multiple mobile devices that are at least proximate to the transport, of emergency routing instructions for the at least a portion of the passengers that are associated with the at least a subset of the multiple mobile devices. The emergency routing instructions may be based, at least in part, on the approximate location of the emergency situation, on a type of the emergency situation, and/or on locations of the at least a subset of the multiple mobile devices, just to name a few examples. Additional related example implementations, including those that pertain to mobile devices, are described further herein below with particular reference to FIGS. 18 and 19.

Figure 9:
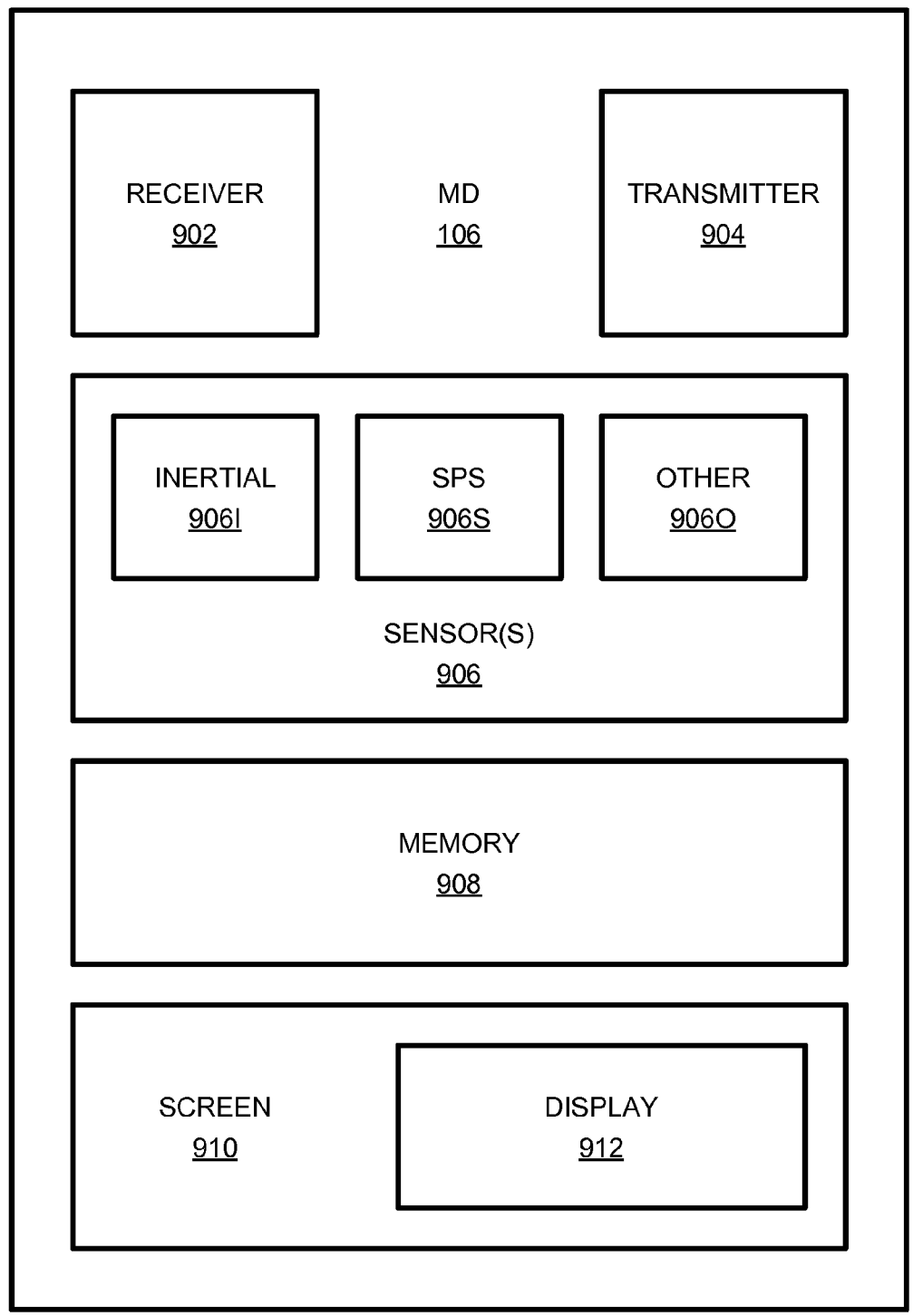
FIG. 9 is a schematic diagram of an example mobile device having multiple components according to an implementation.

FIG. 9 is a schematic diagram 900 of an example mobile device 106 having multiple components according to an implementation. As illustrated, mobile device 106 may include at least one receiver 902, at least one transmitter 904, one or more sensors 906, at least one memory 908, and/or at least one screen 910, just to name a few example components. Sensor(s) 906 may include one or more inertial sensors 9061, one or more SPS sensors 906S, and/or one or more other sensors 9060, just to name a few examples. During operation, mobile device 106 may present on screen 910 a display 912. Inertial sensors 9061 may include, by way of example but not limitation, one or more accelerometers, one or more gyroscopes, any combination thereof, and so forth. An SPS sensor 906S may be configured to secure an SPS-based position fix (e.g., to acquire one or more SPS-based coordinates).

Examples of mobile devices 106 may include, but are not limited to, a mobile station, a mobile phone, a mobile handset, a user equipment, a netbook, a laptop, a tablet computer, a slate computer, a personal digital assistant (PDA), a personal navigation device (PND) (e.g., an electronic mapping display device), an entertainment appliance, some combination thereof, and so forth, just to name a few examples. Furthermore, a mobile device 106 may comprise any mobile device with wireless capabilities. Additional mobile device examples are described herein below with particular reference to FIG. 20. However, claimed subject matter is not limited to any particular type, size, category, capability level, etc. of mobile device.

As described herein above, a device (e.g., a mobile device 106 and/or a control device 602) may determine to utilize at least one of a first navigational coordinate system or a second navigational coordinate system based at least partly on one or more predetermined conditions. For certain example implementations, one or more predetermined conditions may include, but are not limited to, the following examples. It should be understood, therefore, that claimed subject matter is not limited to any of the following particular examples.

In an example implementation, at least one of the one or more predetermined conditions may comprise obtaining at least one signal via at least one transmitter that is fixed to a transport. By way of example only, a mobile device 106 may obtain at least one wireless communication signal 606 via receiver 902 and at least one transmitter device 604 that is fixed to a transport 104. Alternatively, a component of a mobile device 106 may obtain at least one signal from a memory 908, with the at least one signal being previously acquired (e.g., via at least one transmitter device 604 that is fixed to a transport 104). Such a signal may indicate that a transport has left port and/or is sailing on the open seas.

When a transport is in motion, relevant positions may be calculated relative to fixed points on the transport. Hence, a ship's navigational system may provide a map of the ship that is downloadable onto multiple mobile devices, with wireless access device locations in relative shipboard coordinates. The origin and/or orientation may be held constant—relative to the ship. Wireless access devices, for example, can then provide accurate indoor positioning within the same coordinate system.

In an example implementation, a mobile device may process information from one or more inertial sensors. At least one of the one or more predetermined conditions may comprise verifying (or verification of) an association of the processed information with at least one signature indicating movement of a transport relative to a global navigational coordinate system. By way of example only, a mobile device 106 may verify that an association exists between a signature indicating movement of a ship on the seas and processed information derived from one or more inertial sensors 9061.

In an example implementation, at least one of the one or more predetermined conditions may comprise ascertaining (or ascertainment of) at least one satellite-based position fix indicating whether a transport has moved. By way of example only, a mobile device 106 may ascertain a position fix using an SPS sensor 906S that indicates a transport 104 has moved (e.g., since a previous position fix and/or is currently in motion).

In an example implementation, at least one of the one or more predetermined conditions may comprise detecting at least one indication by a user to zoom-in to or zoom-out of a display of a mobile device. By way of example only, a mobile device 106 may detect that a user 108 has provided a command to zoom-in to a display 912 (e.g., thereby indicating a desire to focus on navigable areas of a transport 104) or provided a command to zoom-out of a display 912 (e.g., thereby indicating a desire to focus on, or at least include, navigable areas extending beyond a transport 104). Such a zoom-in and/or zoom-out indication may be detected via touch screen sensing, voice control, button input, any combination thereof, and so forth, just to name a few examples.

In an example implementation, at least one of the one or more predetermined conditions may comprise obtaining at least one message via at least one transmitter that is fixed to a transport, the at least one message adapted to instruct a mobile device to utilize a first navigational coordinate system. By way of example only, a mobile device 106 may obtain (e.g., from a receiver 902 and/or a memory 908) at least one message that is/was acquired via a transmitter device 604 that is fixed to a transport 104. Such a message may be sent by a control device 602 to instruct mobile devices 106 to utilize a navigational coordinate system that is associated with transport 104.

In an example implementation, at least one of the one or more predetermined conditions may comprise determining that the transport is substantially stationary at a port. By way of example only, such a determination may be made using one or more inertial sensors 9061 in conjunction with a comparison involving a stationary signature, may be made by receiving a signal and/or message indicating that a transport is docking or is docked via a transmitter device 604, may be made by retrieving a docking schedule from memory 908, a combination thereof, and so forth.

As described herein above, a user of a mobile device may be sufficiently proximate to a transport while on land (or another structure) and/or sufficiently proximate to land (or another structure) while on a transport so as to prefer to see respective maps seamlessly displayed on the mobile device. Respective maps may be seamlessly displayed, by way of example but not limitation, by enabling a user to see, trace, follow, etc. a route or other path onto or off of the transport to thereby enable a transition onto or off of the transport. However, claimed subject matter is not so limited.

Figure 10:
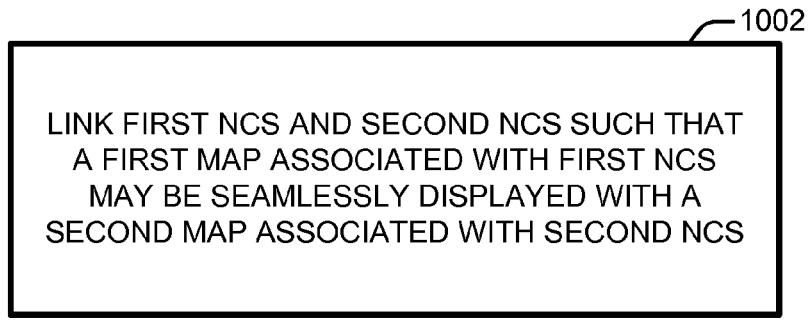
FIG. 10 is a block diagram illustrating part of an example method that may include utilizing at least one determined navigational coordinate system by linking a first and a second navigational coordinate system according to an implementation.

FIG. 10 is a block diagram 1000 illustrating part of an example method that may include utilizing at least one determined navigational coordinate system by linking a first and a second navigational coordinate system according to an implementation. As illustrated, block diagram 1000 may include operation 1002. For certain example implementations, it may be determined that a transport is substantially stationary at a port. If so, a determination to utilize one or more navigational coordinate systems may comprise determining to utilize the first navigational coordinate system and the second navigational coordinate system based, at least in part, on the determination that the transport is substantially stationary at the port. At operation 1002, a first navigational coordinate system and a second navigational coordinate system may be linked such that a first map associated with the first navigational coordinate system may be seamlessly displayed with a second map associated with the second navigational coordinate system. However, claimed subject matter is not limited to map linkages under any particular conditions, timings, and so forth.

Figure 11:
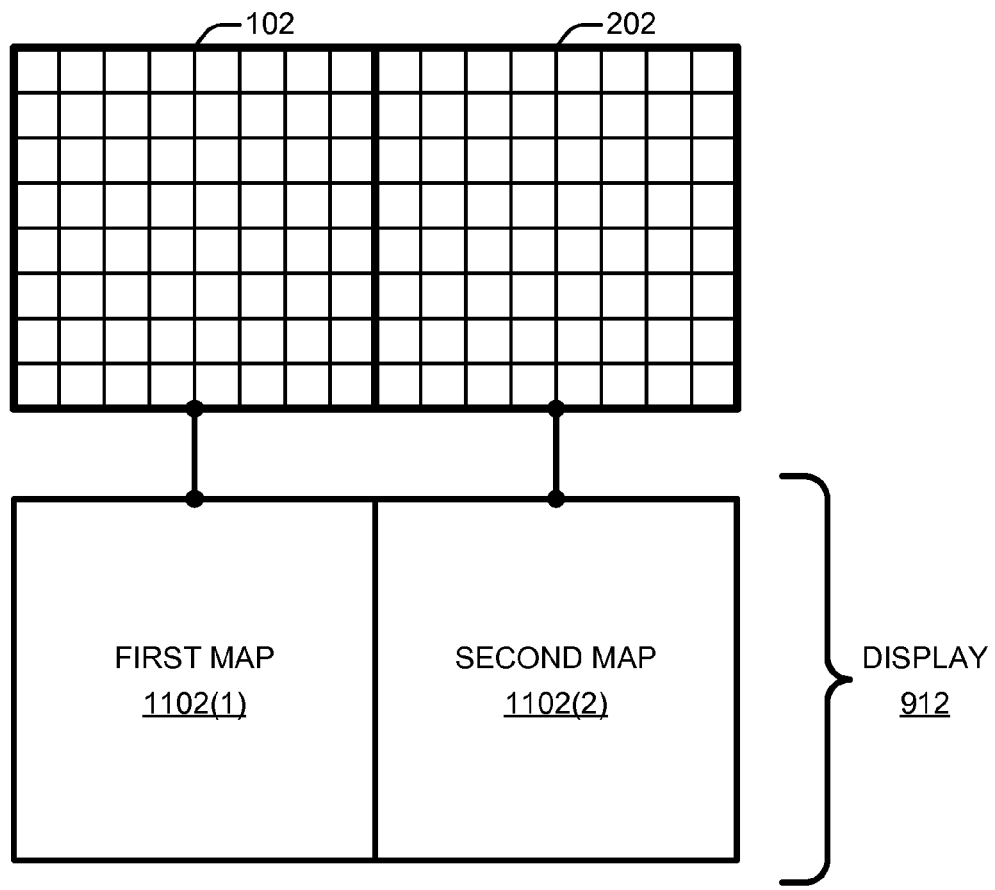
FIG. 11 is a schematic diagram of an example linking of a first and a second navigational coordinate system that are associated with a first and a second map according to an implementation.

FIG. 11 is a schematic diagram 1100 of an example linking of a first and a second navigational coordinate system that are associated with a first and a second map according to an implementation. As illustrated, schematic diagram 1100 may include a first navigational coordinate system 102, a second navigational coordinate system 202, a first map 1102(1), a second map 1102(2), and a display 912. For certain example implementations, first navigational coordinate system 102 may be associated with first map 1102(1), and second navigational coordinate system 202 may be associated with second map 1102(2). In an example operation, first map 1102(1) and second map 1102(2) may be seamlessly presented on a display 912 of a mobile device 106. However, claimed subject matter is not limited to any particular approach to seamlessly displaying maps. For example, all of first map 1102(1) and/or second map 1102(2) need not be currently visible on a display 912 at any given moment.

Figures 12, 13:
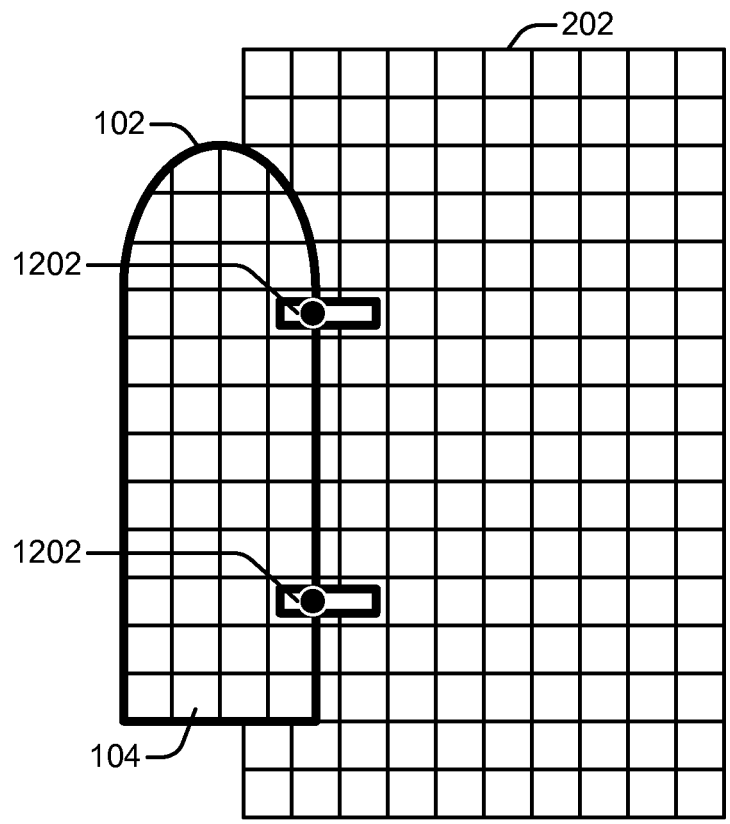
FIG. 12 is a schematic diagram of an example linking of a first and a second navigational coordinate system based on one or more coordinates according to an implementation.
FIG. 13 is a block diagram illustrating part of an example method that may include utilizing at least one determined navigational coordinate system by updating a linking of a first and a second navigational coordinate system according to an implementation.

FIG. 12 is a schematic diagram 1200 of an example linking of a first and a second navigational coordinate system based on one or more coordinates according to an implementation. As illustrated, schematic diagram 1200 may include a first navigational coordinate system 102, a second navigational coordinate system 202, a transport 104, and one or more coordinates 1202. By way of example only, coordinates 1202 may comprise one or more coordinates that overlap with and/or connect a first navigational coordinate system 102 and a second navigational coordinate system 202. For instance, docking anchors, passenger ramps, some combination thereof, etc. may serve as coordinates 1202.

For certain example implementations, one or more second coordinates that are defined according to a second navigational coordinate system 202 may be obtained. Such one or more second coordinates may correspond to one or more first coordinates that are defined according to a first navigational coordinate system 102. One or both of such first and second coordinates may be represented by coordinates 1202. A linking of navigational coordinate systems may further comprise linking a first navigational coordinate system 102 and a second navigational coordinate system 202 using at least the one or more second coordinates. For example, first and second navigational coordinate systems 102 and 202 may be aligned by matching one or more first coordinates to a corresponding one or more second coordinates.

In an example implementation, when a ship arrives in port, a shipboard navigational coordinate system may be anchored to a global navigational coordinate system again. Anchoring information may be calculated, for example, based at least partly on SPS readings of the ship, and such anchoring information may be relayed to mobile devices. Mobile devices can use this information to provide seamless navigation from the ship to shore, and vice versa. A cruise ship may further provide information about the port and nearby attractions, such as by including it as part of map annotation information.

As described hereinabove, a transport may move relative to a dock or other structure in a horizontal or vertical direction. Consequently, a first navigational coordinate system may move relative to a second navigational coordinate system. To maintain alignment, a linking between and/or among multiple such navigational coordinate systems may be updated to reflect such movement.

FIG. 13 is a block diagram 1300 illustrating part of an example method that may include utilizing at least one determined navigational coordinate system by updating a linking of a first and a second navigational coordinate system according to an implementation. As illustrated, block diagram 1300 may include operation 1302. For certain example implementations, one or more messages indicating a change in a position of a first navigational coordinate system relative to a second navigational coordinate system may be obtained. At operation 1302, a linking of the first navigational coordinate system and the second navigational coordinate system may be updated responsive to the change in the position so that at least one route may be correctly determined between a first point of interest of a first map associated with the first navigational coordinate system and a second point of interest of a second map associated with the second navigational coordinate system. Thus, a route from a passenger's room onboard a ship to a restaurant at a port, and vice versa, may be correctly determined even if the ship moves relative to a dock of the port while the passenger is at the restaurant.

Figure 14:
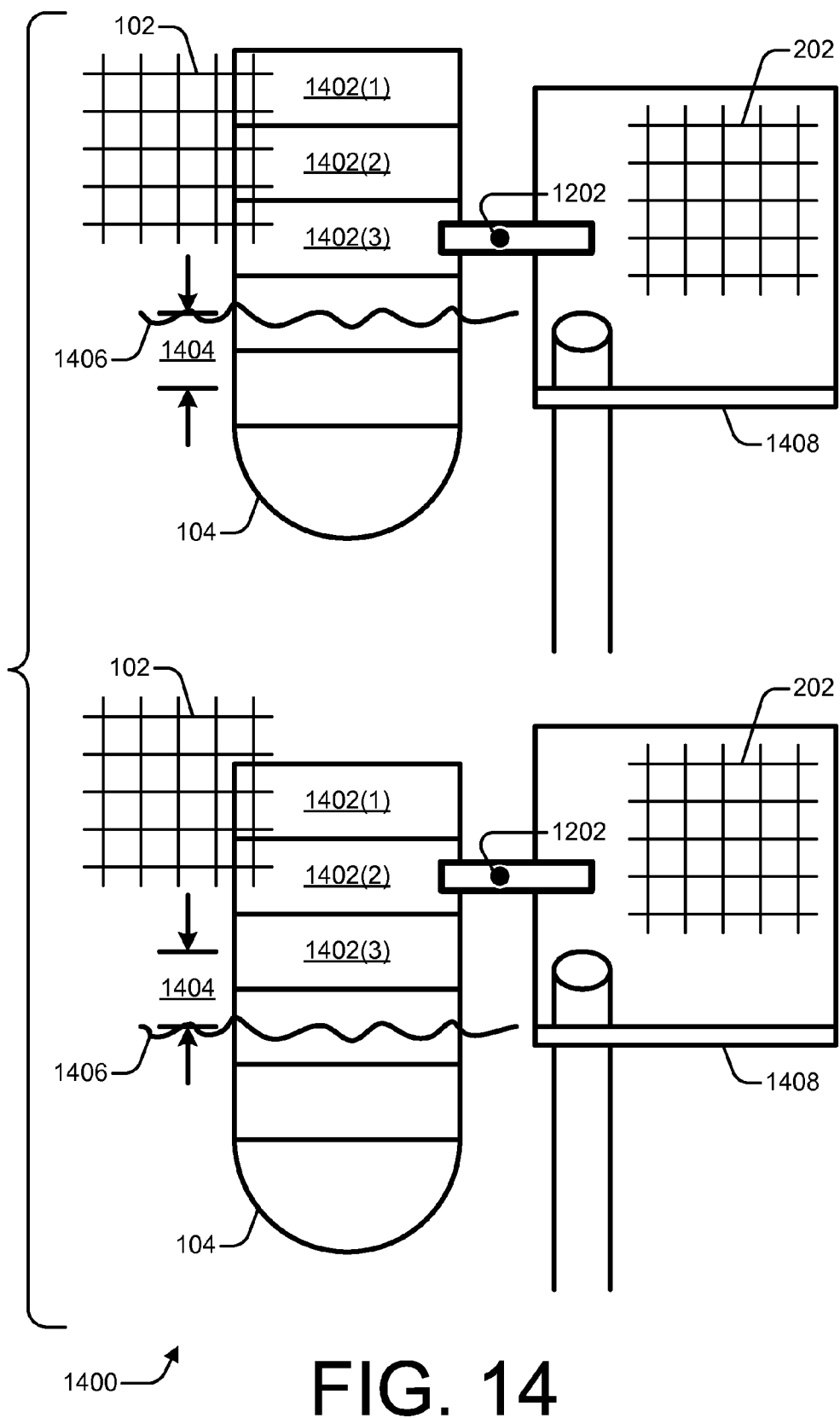
FIG. 14 is a schematic diagram illustrating an example updating of a linking of a first and a second navigational coordinate system if a tide level changes a position of a transport relative to a dock according to an implementation.

FIG. 14 is a schematic diagram 1400 illustrating an example updating of a linking of a first and a second navigational coordinate system if a tide level changes a position of a transport relative to a dock according to an implementation. As illustrated, schematic diagram 1400 may include a first navigational coordinate system 102, a second navigational coordinate system 202, a transport 104, multiple decks 1402 (1, 2, 3) of transport 104, one or more coordinates 1202, at least a relative change in position 1404, a tide level 1406, and a dock 1408. As shown, a transport 104 is located at a port. For certain example implementations, transport 104 comprises a ship, and the port includes a dock 1408. A change in position 1404 may comprise at least a vertical movement of the ship relative to dock 1408. More generally, a first navigational coordinate system may move relative to a second navigational coordinate system at least in a vertical direction (e.g., at least partially along a z-axis, such that relative altitudes change, etc.).

At high tide as shown in the upper portion of schematic diagram 1400, a ramp connects transport 104 via deck 1402 (3). At low tide as shown in the lower portion of schematic diagram 1400, a ramp connects transport 104 via deck 1402 (2). To reduce potential confusion for passengers and/or to facilitate routings to and from transport 104, a linking between first and second navigational coordinate systems 102 and 202 may be updated to reflect that embarking and disembarking routes change from being through deck 1402(3) at high tide to being through deck 1402(2) at low tide. By way of example only, seamless stitching of first and second navigational coordinate systems 102 and 202 may be effected via one or more coordinates 1202 so that a z-axis of the two navigational coordinate systems may be correctly linked. As described hereinabove, a passenger on a transport may prefer that a map, which is displayed on an associated mobile device, be oriented in a manner that aligns with or matches actual physical features of the transport, even if the transport changes direction. Orienting a map to match, for instance, a real-world corridor and rooms that are located along it can make it easier for a user to follow a route displayed on the map along the corridor.

Figure 15:
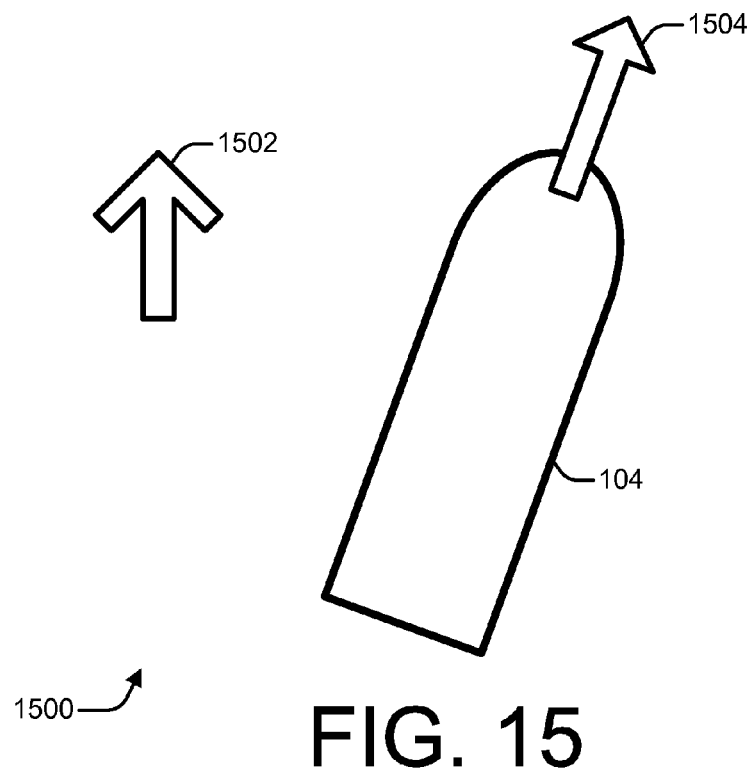
FIG. 15 is a schematic diagram of a transport with regard to a heading of the transport and a reference datum according to an implementation.

FIG. 15 is a schematic diagram 1500 of a transport with regard to a heading of the transport and a reference datum according to an implementation. As illustrated, schematic diagram 1500 may include a transport 104, a reference datum 1502, and a heading 1504 of the transport. For certain example implementations, heading 1504 may be obtained by a control device 602 (e.g., of FIG. 6) of transport 104 as part of and/or in conjunction with a navigational system of the transport. Reference datum 1502 may comprise, by way of example but not limitation, a northerly direction (e.g., as represented by true North, magnetic North, etc.). Other compass directions may alternatively be used. Heading 1504 may be defined with regard to reference datum 1502.

Figure 16:
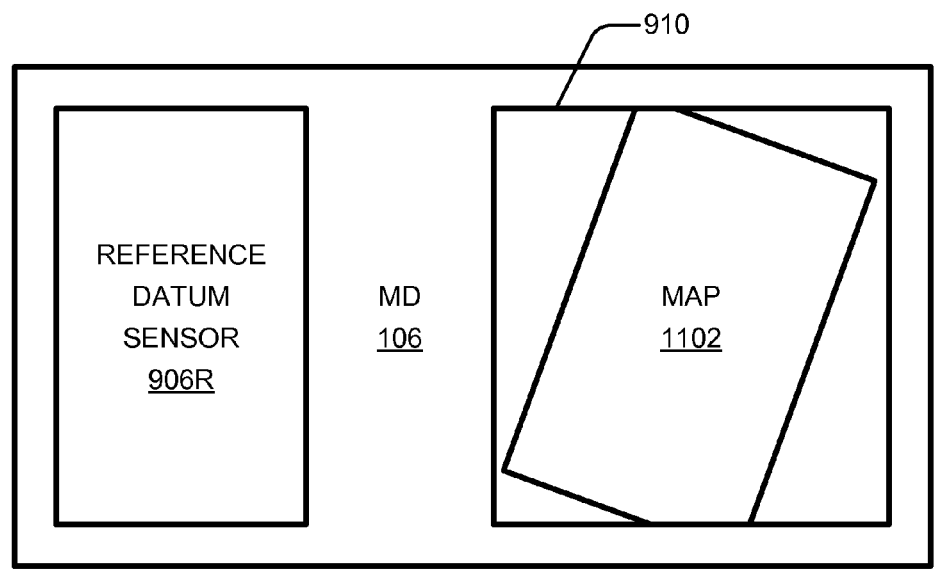
FIG. 16 is a schematic diagram of a mobile device having a reference datum sensor and a screen that is capable of displaying a map according to an implementation.

FIG. 16 is a schematic diagram 1600 of a mobile device having a reference datum sensor and a screen that is capable of displaying a map according to an implementation. As illustrated, schematic diagram 1600 may include a mobile device 106 having at least one reference datum sensor 906R and a screen 910. For certain example implementations, mobile device 106 may display a map 1102 such that it is oriented to be aligned with real-world features of a transport 104. Map 1102 may include a first map 1102(1) and/or a second map 1102(2) (both of FIG. 11). In an example implementation, a transport 104 may comprise a cruise ship, and heading 1504 of the transport may comprise at least one heading of the cruise ship. Reference datum 1502 may comprise at least an approximate magnetic or true north. Although map 1102 is shown at one particular "zoom" level on screen 910, claimed subject matter is not so limited. For example, map 1102 may be selectively zoomed to a level that focuses on a given corridor, that focuses on an entertainment area, that focuses on an entire width of a ship, that focuses on an entire length of a ship, and so forth.

Figure 17:
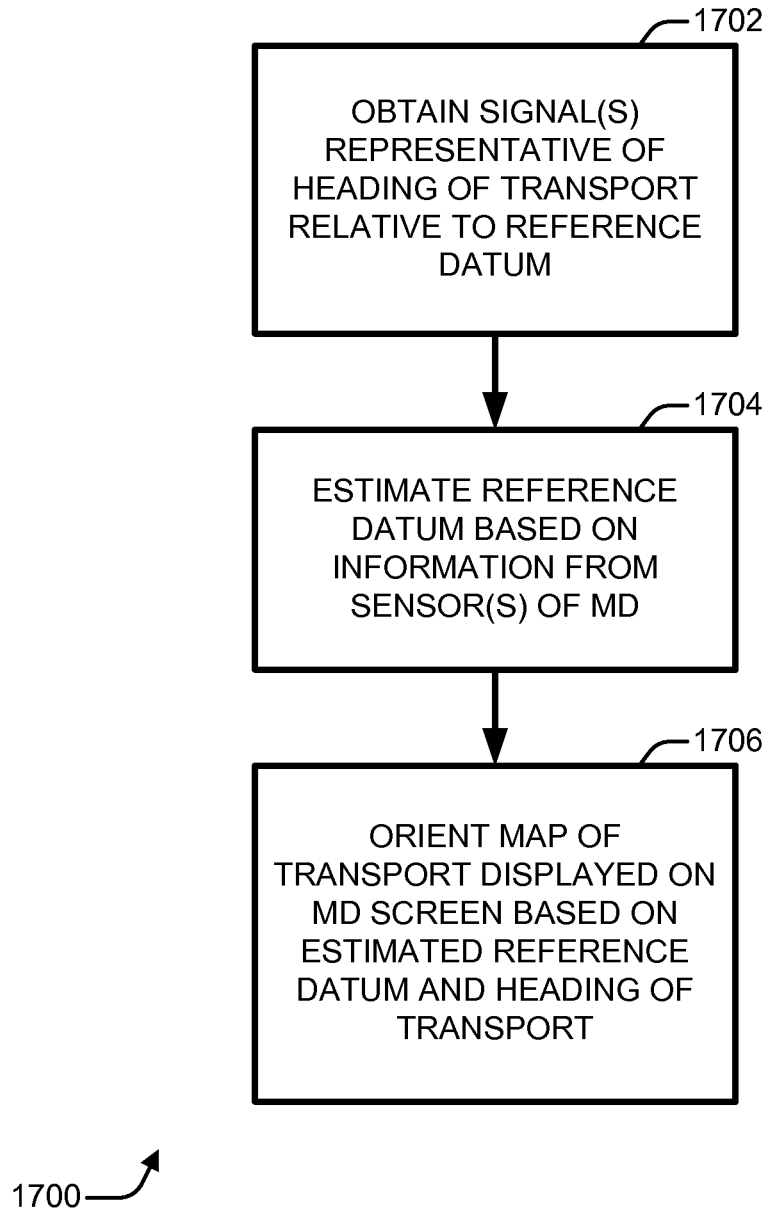
FIG. 17 is a flow diagram illustrating an example method for utilizing a heading of a transport and a reference datum to orient a map that is displayable on a screen of a mobile device according to an implementation.

FIG. 17 is a flow diagram 1700 illustrating an example method for utilizing a heading of a transport and a reference datum to orient a map that is displayable on a screen of a mobile device according to an implementation. As illustrated, flow diagram 1700 may include three operational blocks 1702-1706. Such operations may be performed in alternative manners, with a different order, and/or with a different number of operations without departing from claimed subject matter. Also, at least some operations of flow diagram 1700 may be performed so as to be fully or partially overlapping with other operation(s). For certain example implementations, operations 1702-1706 may be performed at least partially by at least one mobile device 106 that is at least proximate to (e.g., located on, within wireless communication of, etc.) a transport 104.

At operation 1702, one or more signals representative of at least one heading of a transport relative to at least one reference datum may be obtained. For example, signals representative of a heading 1504 of a transport 104 relative to at least one reference datum 1502 may be obtained. For instance, one or more wireless signals that are derived from at least one shipboard sensor may be received from a transmitter device 604 (of FIG. 6), one or more signals that are derived from SPS data may be received (e.g., from a satellite, from an SPS sensor, from memory, etc.), some combination thereof, and so forth. Changes in SPS data may be used to determine a heading of a transport (e.g., at least one direction of movement may be inferred from two or more different locations).

At operation 1704, the at least one reference datum may be estimated based, at least in part, on information from one or more sensors (e.g., at least one reference datum sensor) of a mobile device. For example, at least one reference datum 1502 may be estimated based at least partly on information from at least one reference datum sensor 906R. For instance, a magnetometer alone and/or in conjunction with other components of a mobile device may estimate a magnetic and/or a true north.

At operation 1706, a map of at least a portion of the transport that is displayed on a screen of the mobile device may be oriented based, at least in part, on the at least one estimated reference datum and the at least one heading of the transport, with the map being associated with at least the first navigational coordinate system, which is associated with the transport. For example, a map 1102 that is displayed on a screen 910 may be oriented based at least partly on an estimated reference datum 1502 and a heading 1504, with map 1102 including first map 1102(1) representing at least a portion of transport 104 and associated with first navigational coordinate system 102.

As described hereinabove, mobile devices may be used to direct people to appropriate (e.g., safe) areas of a transport when an emergency event is detected. For example, a positioning/navigational server may send emergency routing instructions to multiple mobile devices to provide passengers with instructions to navigate to a safe area.

Figures 18, 19:
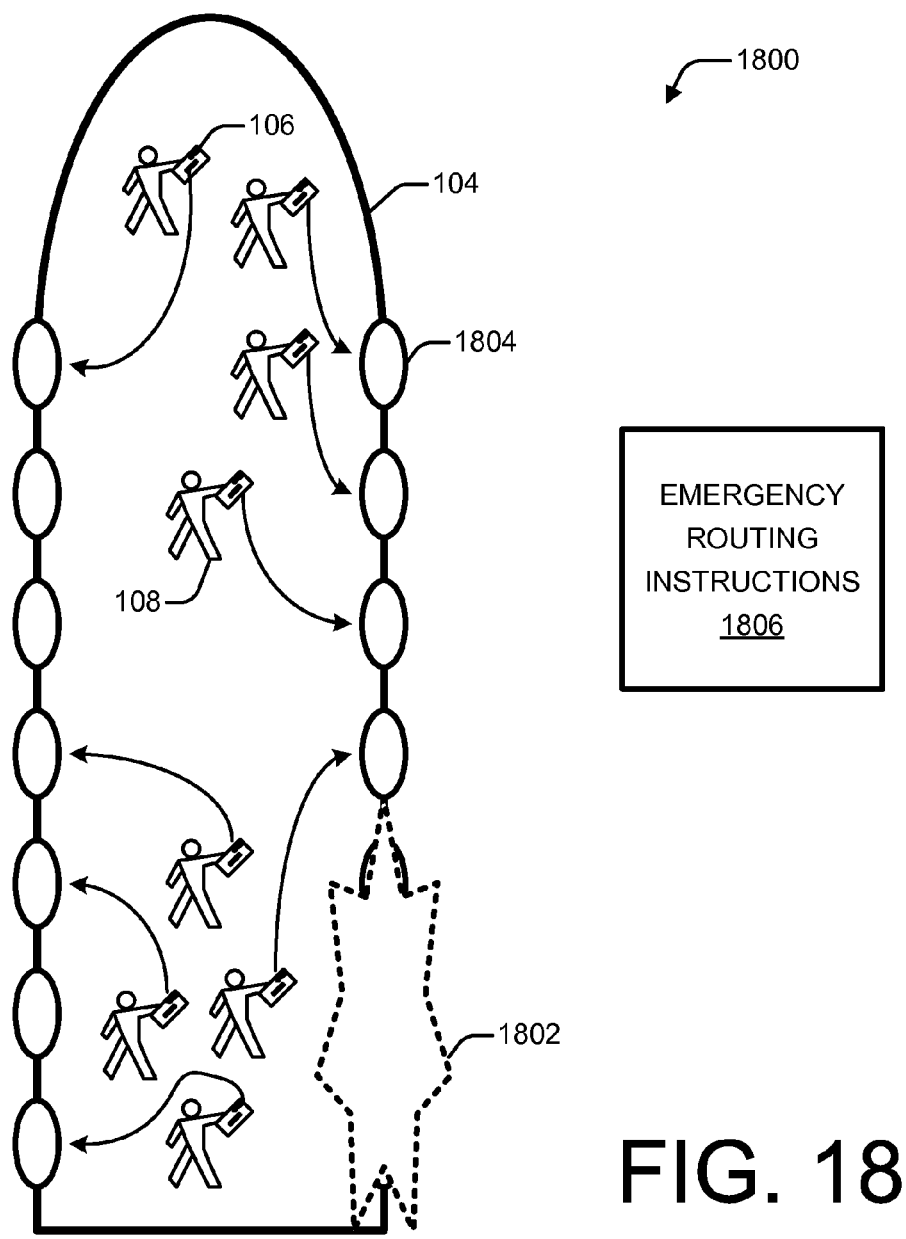
FIG. 18 is a schematic diagram of a transport bearing multiple passengers and associated mobile devices in conjunction with an emergency situation according to an implementation.
FIG. 19 is a block diagram illustrating part of an example method that may include utilizing at least one determined navigational coordinate system by obtaining emergency routing instructions that are based at least on a location of an emergency according to an implementation.

FIG. 18 is a schematic diagram 1800 of a transport bearing multiple passengers and associated mobile devices in conjunction with an emergency situation according to an implementation. As illustrated, schematic diagram 1800 may include a transport 104, multiple mobile devices 106, multiple users 108, at least one emergency event 1802, multiple evacuation resources 1804, and emergency routing instructions 1806. For certain example implementations, a transport 104 may have multiple evacuation resources 1804, such as doors, parachutes, life preservers, boats, evacuation points, combinations thereof, and so forth, just to name a few examples. Although relatively many passengers may be present at the aft portion of transport 104 when emergency event 1802 is detected, at least some of such passengers should be directed forward because emergency event 1802 has blocked or destroyed proximate evacuation resources 1804 at the starboard side of the aft portion of transport 104.

FIG. 19 is a block diagram 1900 illustrating part of an example method that may include utilizing at least one determined navigational coordinate system by obtaining emergency routing instructions that are based at least on a location of an emergency according to an implementation. As illustrated, block diagram 1900 may include operation 1902. At operation 1902, emergency routing instructions may be obtained at a mobile device, with the emergency routing instructions being based, at least in part, on a location of an emergency at a transport and on multiple locations corresponding to multiple mobile devices that are present at the transport.

Emergency routing instructions may be adapted to direct at least one passenger to one or more evacuation resources of the transport using the mobile device. For example, emergency routing instructions 1806 may be obtained at a mobile device 106. Emergency routing instructions 1806 may be based at least partly on a location of an emergency/emergency event 1802 at a transport 104. Such instructions may also be based on locations of passengers, a nature of the emergency, some combination thereof, and so forth, just to name a few examples. Emergency routing instructions 1806 may be adapted to direct one or more users 108 to one or more evacuation resources 1804 of transport 104 using one or more mobile devices 106.

Conversely, if no evacuation resources are blocked but one-third of the passengers are located at the back of the ship watching a show when an emergency occurs, a routing algorithm can direct these passengers toward evacuation resources at the back of the ship. And remaining passengers in the rest of the ship can be directed toward forward evacuation resources. Also, depending on an actual event taking place, the captain/crew may provide additional details that may be used by a routing algorithm at a ship's navigational control device and/or on a distributed routing algorithm on users' mobile devices. For instance, distance from land, presence of a nearby rescue ship, etc. may be relevant factors.

Figure 20:
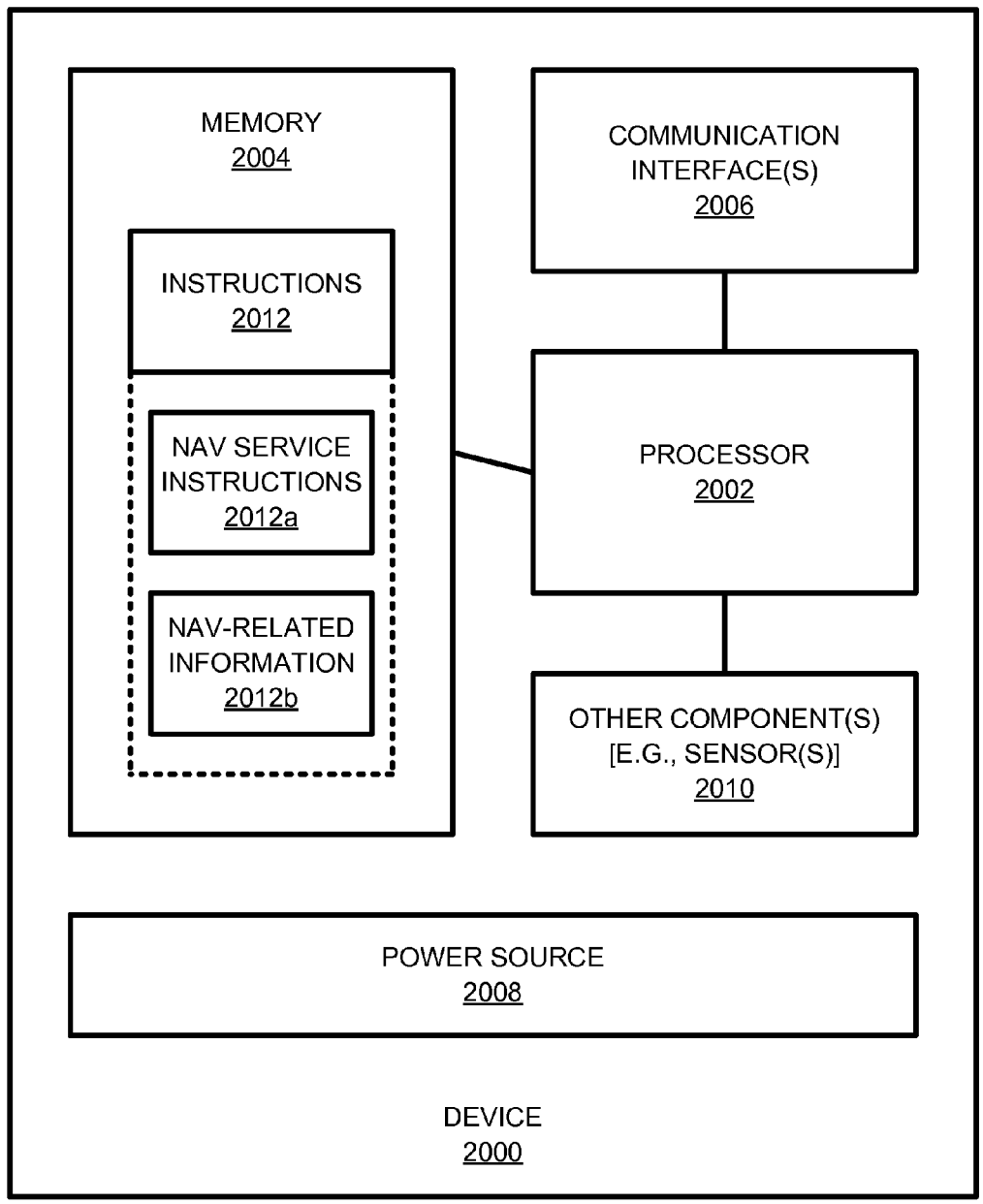
FIG. 20 is a schematic diagram illustrating an example device, according to an implementation, that may implement one or more aspects of navigational coordinate systems in conjunction with transports and/or mobile devices.

FIG. 20 is a schematic diagram illustrating an example device 2000, according to an implementation, that may implement one or more aspects of navigational coordinate systems in conjunction with transports and/or mobile devices. As illustrated, device 2000 may include at least one processor 2002, one or more memories 2004, at least one communication interface 2006, at least one power source 2008, and other component(s) 2010, such as an SPS unit (SPSU) or other sensor(s) (not explicitly shown). Memory 2004 is illustrated as including instructions 2012. However, a device 2000 may alternatively include more, fewer, and/or different components from those that are illustrated without deviating from claimed subject matter.

For certain example implementations, device 2000 may include and/or comprise at least one electronic device. Device 2000 may comprise, for example, any electronic device having at least one processor and/or memory. Examples for device 2000 include, but are not limited to, relatively fixed processing devices (e.g., a desktop computer, one or more server machines, at least one telecommunications node, an intelligent router/switch, an access point, some combination thereof, etc.), relatively mobile processing devices (e.g., a notebook computer, a personal digital assistant (PDA), a netbook, a slate or tablet computer, a portable entertainment device, a mobile phone, a smart phone, a mobile station, user equipment, some combination thereof, etc.), and so forth.

Power source 2008 may provide power to components and/or circuitry of device 2000. Power source 2008 may be a portable power source, such as a battery, or a fixed power source, such as an outlet or other conduit in a car, house, or other building to a public utility power source. Power source 2008 may also be a transportable power source, such as a solar or carbon-fuel-based generator. Power source 2008 may be integrated with or separate from device 2000.

Processor 2002 may comprise any one or more processing units. Memory 2004 may store, contain, or otherwise provide access to instructions 2012 (e.g., a program, an application, etc. or portion thereof; operational data structures; processor-executable instructions; code; some combination thereof; and so forth) that may be executable by processor 2002. Execution of such instructions 2012 by one or more processors 2002 may transform device 2000 into a special-purpose computing device, apparatus, platform, some combination thereof, and so forth.

Instructions 2012 may include navigational service instructions 2012*a*, navigational-related information 2012*b*, and so forth, just to name a couple of examples. In certain example mobile device implementations (e.g., which may include at least one mobile device 106), navigational service instructions 2012*a* may correspond to, for example, instructions that are capable of realizing at least a portion of one or more of: flow diagram 500 (of FIG. 5), block diagram 1000 (of FIG. 10), block diagram 1300 (of FIG. 13), flow diagram 1700 (of FIG. 17), block diagram 1900 (of FIG. 19), other operation(s) described herein as being performable by a mobile device, any combination thereof, and so forth, just to name a few examples. Navigational-related information 2012*b* may include, but is not limited to, mapping information, routability information, static and/or dynamic directions, annotation information (e.g., points of interest information, feasible area information, etc.) for a map, some combination thereof, and so forth, as is described further herein above.

In certain example fixed device implementations (e.g., which may include a control device 602 and/or at least one transmitter device 604), navigational service instructions 2012*a* may correspond to, for example, instructions pertaining to navigational coordinate control 702 (of FIG. 7), location-based services control 706 (of FIG. 7) and/or emergency routing instructions 1806 (of FIG. 18) as well as those instructions that are capable of realizing at least a portion of one or more of: flow diagram 800 (of FIG. 8), other operation(s) described herein as being performable by a control device/ server of a transport 104, any combination thereof, and so forth, just to name a few examples. Navigational-related information 2012*b* may include, by way of example but not limitation, location-based services information 704 (of FIG. 7), as well as information described for any one or more of those example implementations described herein above. Other alternatives for navigational service instructions 2012*a* and/or navigational-related information 2012*b* for both mobile and fixed implementations may be realized without departing from claimed subject matter.

Communication interface(s) 2006 may provide one or more interfaces between device 2000 and other devices (e.g., and/or human operators). Hence, communication interface 2006 may include a screen, speaker, keyboard or keys, or other human-device input/output feature(s). Communication interface 2006 may include a transceiver (e.g., transmitter and/or receiver), a radio, an antenna (and/or a transmitter device 604 coupled to a control device 602), a wired interface connector or other such apparatus, a network adapter or port, some combination thereof, etc. to communicate wireless and/or wired signals (e.g., over wireless or wired communication links). Such communications with at least one communication interface 2006 may enable transmitting, receiving, initiating of transmissions, and so forth, just to name a few examples. Communication interface 2006 may also serve as a bus or other interconnect between and/or among other components of device 2000. Other component(s) 2010, if present, may comprise one or more other miscellaneous sensors, features, and so forth.

Methodologies described herein may be implemented by various means depending upon applications according to particular features and/or examples. For example, such methodologies may be implemented in hardware, firmware, software, discrete/fixed logic circuitry, any combination thereof, and so forth. In a hardware and/or logic circuitry implementation, for example, a processor/processing unit may be implemented within one or more application specific integrated circuits (ASICs), digital signal processors (DSPs), digital signal processing devices (DSPDs), programmable logic devices (PLDs), field programmable gate arrays (FPGAs), processors generally, controllers, micro-controllers, microprocessors, electronic devices, other devices or units programmed to execute instructions and/or designed to perform the functions described herein, and/or combinations thereof, just to name a few examples. Herein, the term "control logic" may encompass logic implemented by software, hardware, firmware, discrete/fixed logic circuitry, any combination thereof, and so forth.

For at least firmware and/or software implementation, the methodologies may be implemented with modules (e.g., procedures, functions, etc.) having instructions that perform the functions described herein. Any machine readable medium tangibly embodying instructions may be used in implementing the methodologies described herein. For example, software coding may be stored in a memory and executed by a processor. Memory may be implemented within the processor or external to the processor. As used herein the term "memory" refers to any type of long term, short term, volatile, nonvolatile, or other storage memory/medium and is not to be limited to any particular type of memory or number of memories, or type of media upon which memory is stored.

In one or more example implementations, the functions described may be implemented in hardware, software, firmware, discrete/fixed logic circuitry, some combination thereof, and so forth. If implemented in firmware and/or software, the functions may be stored on a physical computer-readable (e.g., via electrical digital signals) medium as one or more instructions or code (e.g., and realized as at least one article of manufacture comprising at least one storage medium having instructions stored thereon). Computer-readable media include physical computer storage media that may be encoded with a data structure, computer program, a combination thereof, and so forth. A storage medium may be any available physical medium that can be accessed by a computer. By way of example, and not limitation, such computer-readable media can comprise RAM, ROM, EEPROM, CD-ROM or other optical disc storage, magnetic disk storage or other magnetic storage devices, or any other medium that can be used to store desired program code in the form of instructions or data structures and that can be accessed by a computer and/or processor thereof. Disk and disc, as used herein, includes compact disc (CD), laser disc, optical disc, digital versatile disc (DVD), floppy disk and blu-ray disc, where disks usually reproduce data magnetically, while discs usually reproduce data optically with lasers.

Also, computer instructions/code/data may be transmitted via signals over physical transmission media from a transmitter to a receiver (e.g., via electrical digital signals). For example, software may be transmitted from a website, server, or other remote source using a coaxial cable, fiber optic cable, twisted pair, digital subscriber line (DSL), or physical components of wireless technologies such as infrared, radio, and microwave. Combinations of the above may also be included within the scope of physical transmission media. Such computer instructions and/or data may be transmitted in portions (e.g., first and second portions) at different times (e.g., at first and second times).

Electronic devices may also operate in conjunction with Wi-Fi/WLAN or other wireless networks. For example, positioning data may be acquired via a Wi-Fi or other wireless network. In addition to Wi-Fi/WLAN signals, a wireless/mobile device may also receive signals from satellites, which may be from a Global Positioning System (GPS), Galileo, GLONASS, NAVSTAR, QZSS, a system that uses satellites from a combination of these systems, or any SPS developed in the future, each referred to generally herein as a Satellite Positioning System (SPS) or GNSS (Global Navigation Satellite System). Furthermore, implementations described herein may be used with positioning determination systems that utilize pseudolites or a combination of satellites and pseudolites. Pseudolites are usually ground-based transmitters that broadcast a Pseudo-Random Noise (PRN) code or other ranging code (e.g., similar to a GPS or CDMA cellular signal) that is modulated on an L-band (or other frequency) carrier signal, which may be synchronized with GPS time. Each such transmitter may be assigned a unique PN code so as to permit identification by a remote receiver. Pseudolites may be particularly useful in situations where SPS signals from an orbiting satellite might be unavailable, such as in tunnels, mines, buildings, urban canyons, or other enclosed areas. Another implementation of pseudolites is known as radio-beacons. The term "satellite", as used herein, is also to include pseudolites, equivalents of pseudolites, and similar and/or analogous technologies. The term "SPS signals", as used herein, is also to include SPS-like signals from pseudolites or equivalents of pseudolites. Certain implementations may also be applied to femtocells or a combination of systems that includes femtocells. For example, femtocells may provide data and/or voice communication. Moreover, femtocells may provide positioning data.

In an example implementation, an SPS unit (when present) may be capable of determining a location of device 2000 using an SPS system or systems. Hence, example implementations that are described herein may be used with various SPSs. An SPS typically includes a system of transmitters positioned to enable entities to determine their location on or above the Earth based, at least in part, on signals received from the transmitters. Such a transmitter typically, but not necessarily, transmits a signal marked with a repeating pseudo-random noise (PN) code of a set number of chips and may be located on ground based control stations, user equipment, and/or space vehicles. In a particular example, such transmitters may be located on Earth orbiting satellite vehicles (SVs). For example, a SV in a constellation of Global Navigation Satellite System (GNSS) such as Global Positioning System (GPS), Galileo, Glonass or Compass may transmit a signal marked with a PN code that is distinguishable from PN codes transmitted by other SVs in the constellation (e.g., using different PN codes for each satellite as in GPS or using the same code on different frequencies as in Glonass). In accordance with certain aspects, the techniques presented herein are not restricted to global systems (e.g., GNSS) for SPS. For example, the techniques provided herein may be applied to or otherwise enabled for use in various regional systems, such as, e.g., Quasi-Zenith Satellite System (QZSS) over Japan, Indian Regional Navigational Satellite System (IRNSS) over India, Beidou over China, etc., and/or various augmentation systems (e.g., a Satellite Based Augmentation System (SBAS)) that may be associated with or otherwise enabled for use with one or more global and/or regional navigation satellite systems. By way of example but not limitation, an SBAS may include an augmentation system(s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like. Thus, as used herein, an SPS may include any combination of one or more global and/or regional navigation satellite systems and/or augmentation systems, and SPS signals may include SPS, SPS-like, and/or other signals associated with such one or more SPS.

Some portions of this Detailed Description are presented in terms of algorithms or symbolic representations of operations on binary digital signals that may be stored within a memory of a specific apparatus or special purpose computing device or platform. In the context of this particular Specification, the term specific apparatus or the like includes a general purpose computer once it is programmed to perform particular functions pursuant to instructions from program software/instructions. Algorithmic descriptions or symbolic representations are examples of techniques used by those of ordinary skill in the signal processing or related arts to convey the substance of their work to others skilled in the art. An algorithm here, and generally, may be considered to be a self-consistent sequence of operations or similar signal processing leading to a desired result. In this context, operations or processing involve physical manipulation of physical quantities. Typically, although not necessarily, such quantities may take the form of electrical and/or magnetic signals capable of being stored, transferred, combined, compared, transmitted, received, or otherwise manipulated.

It has proven convenient at times, principally for reasons of common usage, to refer to such signals as bits, data, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this Specification discussions utilizing terms such as "processing," "computing," "calculating," "determining," "ascertaining," "obtaining," "transmitting," "receiving," "identifying," "utilizing," "performing," "applying," "positioning/locating," "analyzing," "storing," "linking," "estimating," "orienting," "updating," "providing," "detecting,", "initiating (e.g., transmission)," or the like refer to actions or processes of a specific apparatus, such as a special purpose computer or a similar special purpose electronic computing device. In the context of this Specification, therefore, a special purpose computer or a similar special purpose electronic computing device is capable of manipulating or transforming signals, typically represented as physical electronic, electrical, and/or magnetic quantities within memories, registers, or other information storage devices, transmission devices, or display devices of the special purpose computer or similar special purpose electronic computing device.

Likewise, the terms "and" and "or" as used herein may include a variety of meanings that may be expected to depend at least in part upon a context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, characteristic, etc. in the singular or may be used to describe some combination of features, structures, characteristics, etc in the plural. It should be noted, however, that these are merely illustrative examples, and claimed subject matter is not limited to these examples.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concepts described herein. Therefore, it is intended that claimed subject matter not be limited to the particular examples disclosed, but that such claimed subject matter may also include all aspects falling within the scope of appended claims, and equivalents thereof.

What is claimed is:

1. A method for selecting a navigational coordinate system, by a location server associated with a transport, the method comprising:
    identifying a first navigational coordinate system associated with the transport and enabling navigation within at least one navigable area of the transport;
    identifying a second navigational coordinate system;
    determining one or more indications for the at least one mobile device to utilize the first navigational coordinate system, the second navigational coordinate system, or a combination thereof based, at least in part, on detection of one or more predetermined conditions, wherein at least one of the one or more predetermined conditions is independent of a user input; and
    transmitting, to the at least one mobile device that is at least proximate to the transport, the one or more indications that the at least one mobile device is to utilize the first navigational coordinate system, the second navigational coordinate system, or the combination thereof, such that a first map associated with the first navigational coordinate system is seamlessly displayed with a second map associated with the second coordinate system on the at least one mobile device.

2. The method of claim 1, further comprising:
    obtaining one or more second coordinates defined according to the second navigational coordinate system, the one or more second coordinates to correspond to one or more first coordinates defined according to the first navigational coordinate system; and
    initiating transmission, to the at least one mobile device that is at least proximate to the transport, of at least the one or more second coordinates to enable the first navigational coordinate system and the second navigational coordinate system to be linked.

3. The method of claim 1, further comprising:
    obtaining at least one heading of the transport relative to at least one reference datum; and initiating transmission, to the at least one mobile device that is at least proximate to the transport, of one or more signals representative of the at least one heading of the transport relative to the at least one reference datum.

4. The method of claim 1,
wherein the determining the one or more indications for the at least one mobile device to utilize the first navigational coordinate system, the second navigational coordinate system, or the combination thereof is based, at least in part, on a determination that the transport is substantially stationary at the port; and
wherein the transmitting further comprises initiating transmission, to the at least one mobile device that is at least proximate to the transport, of the one or more indications that indicate to the at least one mobile device to utilize the first navigational coordinate system or the second navigational coordinate system by linking the first navigational coordinate system and the second navigational coordinate system.

5. The method of claim 1, further comprising:
obtaining at least an approximate location of an emergency situation at the transport;
obtaining an evacuation plan for at least a portion of passengers of the transport based at least partly on the approximate location of the emergency situation; and
initiating transmission, to multiple mobile devices that are at least proximate to the transport, of emergency routing instructions for the at least a portion of the passengers that are associated with the multiple mobile devices, the emergency routing instructions being based, at least in part, on one or more of: the approximate location of the emergency situation, a category of the emergency situation, or respective locations of the multiple mobile devices.

6. The method of claim 1, further comprising:
determining that at least one event has affected routability information for the transport;
obtaining updated routing information based, at least in part, on the at least one event; and
initiating transmission, to multiple mobile devices that are at least proximate to the transport, of the updated routing information to accommodate the at least one event.

7. The method of claim 6, wherein the at least one event comprises a change in elevation of the transport relative to land due to tidal changes; and
the routability information is affected with respect to at least one point of at least one of ingress or egress, at least partially in response to the change in the elevation of the transport.

8. The method of claim 1, further comprising:
determining that at least a portion of annotation information that is associated with mapping information for the transport has changed; and
initiating transmission, to the at least one mobile device that is at least proximate to the transport, of updated annotation information at least partially responsive to the determining that the at least a portion of the annotation information has changed.

9. An article comprising: at least one non-transitory computer readable storage medium, of a location server, having stored thereon instructions executable by one or more processors to:
identify a first navigational coordinate system associated with a transport and enabling navigation within at least one navigable area of the transport;
identify a second navigational coordinate system;
determine one or more indications for at least one mobile device to utilize the first navigational coordinate system, the second navigational coordinate system, or a combination thereof based, at least in part, on detection of one or more predetermined conditions, wherein at least one of the one or more predetermined conditions is independent of a user input; and
initiate transmission, to the at least one mobile device that is at least proximate to the transport, the one or more indications that the at least one mobile device is to utilize the first navigational coordinate system, the second navigational coordinate system, or the combination thereof, such that a first map associated with the first navigational coordinate system is seamlessly displayed with a second map associated with the second coordinate system on the at least one mobile device.

10. The article of claim 9, wherein the instructions are further executable by the one or more processors to:
process one or more second coordinates defined according to the second navigational coordinate system, the one or more second coordinates to correspond to one or more first coordinates defined according to the first navigational coordinate system; and
initiate transmission, to the at least one mobile device that is at least proximate to the transport, of at least the one or more second coordinates to enable the first navigational coordinate system and the second navigational coordinate system to be linked.

11. The article of claim 9, wherein the instructions are further executable by the one or more processors to:
process at least one heading of the transport relative to at least one reference datum; and
initiate transmission, to the at least one mobile device that is at least proximate to the transport, of one or more signals representative of the at least one heading of the transport relative to the at least one reference datum.

12. The article of claim 9, wherein the instructions are further executable by the one or more processors to:
determine that the transport is substantially stationary at a port;
wherein the instructions executable to determine the one or more indications for the at least one mobile device to utilize the first navigational coordinate system, the second navigational coordinate system, or the combination thereof are based, at least in part, on a determination that the transport is substantially stationary at the port; and
wherein the instructions executable to initiate transmission further comprise instructions executable to initiate transmission, to the at least one mobile device that is at least proximate to the transport, of the one or more indications that indicate to the at least one mobile device to utilize the first navigational coordinate system and the second navigational coordinate system by linking the first navigational coordinate system and the second navigational coordinate system.

13. A device for determining navigational coordinate systems, the device comprising:
a processor configured to:
identify a first navigational coordinate system associated with a transport and enabling navigation within at least one navigable area of the transport;
identify a second navigational coordinate system; and
determine one or more indications for at least one mobile device to utilize the first navigational coordinate system, the second navigational coordinate system, or a combination thereof based, at least in part, on detection of one or more predetermined conditions, wherein at least one of the one or more predetermined conditions is independent of a user input;

a memory; and a communication interface to initiate transmission, to the at least one mobile device that is at least proximate to the transport, the one or more indications that the at least one mobile device is to utilize the first navigational coordinate system, the second navigational coordinate system, or the combination thereof such that a first map associated with the first navigational coordinate system is seamlessly displayed with a second map associated with the second coordinate system on the at least one mobile device.

14. The device of claim 13, wherein:

the processor is further configured to process one or more second coordinates defined according to the second navigational coordinate system, the one or more second coordinates to correspond to one or more first coordinates defined according to the first navigational coordinate system; and the communication interface is further configured to initiate transmission, to the at least one mobile device that is at least proximate to the transport, of at least the one or more second coordinates to enable the first navigational coordinate system and the second navigational coordinate system to be linked.

15. The device of claim 13, wherein:

the processor is further configured to process at least one heading of the transport relative to at least one reference datum; and the communication interface is further configured to initiate transmission, to the at least one mobile device that is at least proximate to the transport, of one or more signals representative of the at least one heading of the transport relative to the at least one reference datum.

16. The device of claim 13:

wherein the processor is further configured to determine that the transport is substantially stationary at a port;

wherein the determining the one or more indications for the at least one mobile device to utilize the first navigational coordinate system, the second navigational coordinate system, or the combination thereof comprises is based, at least in part, on a determination that the transport is substantially stationary at the port; and wherein the initiating transmission further comprises initiating transmission, to the at least one mobile device that is at least proximate to the transport, of the one or more indications that indicate to the at least one mobile device to utilize the first navigational coordinate system and the second navigational coordinate system by linking the first navigational coordinate system and the second navigational coordinate system.

17. A device for determining navigational coordinate systems, the device comprising:

means for identifying a first navigational coordinate system associated with a transport and enabling navigation within at least one navigable area of the transport;

means for identifying a second navigational coordinate system;

means for determining one or more indications for at least one mobile device to utilize the first navigational coordinate system, the second navigational coordinate system, or a combination thereof based, at least in part, on detection of one or more predetermined conditions, wherein at least one of the one or more predetermined conditions is independent of a user input; and means for initiating transmission, to the at least one mobile device that is at least proximate to the transport, the one or more indications that the at least one mobile device is to utilize the first navigational coordinate system, the second navigational coordinate system, or the combination thereof such that a first map associated with the first navigational coordinate system is seamlessly displayed with a second map associated with the second coordinate system on the at least one mobile device.

18. The device of claim 17, further comprising:

means for obtaining one or more second coordinates that are defined according to the second navigational coordinate system, the one or more second coordinates to correspond to one or more first coordinates defined according to the first navigational coordinate system; and means for initiating transmission, to the at least one mobile device that is at least proximate to the transport, of at least the one or more second coordinates to enable the first navigational coordinate system and the second navigational coordinate system to be linked.

19. The device of claim 17, further comprising:

means for obtaining at least one heading of the transport relative to at least one reference datum; and means for initiating transmission, to the at least one mobile device that is at least proximate to the transport, of one or more signals representative of the at least one heading of the transport relative to the at least one reference datum.

20. The device of claim 17, further comprising:

means for determining that the transport is substantially stationary at a port;

wherein the means for determining the one or more indications for the at least one mobile device to utilize the first navigational coordinate system, the second navigational coordinate system, or the combination thereof is based, at least in part, on a determination that the transport is substantially stationary at the port; and wherein the means for initiating transmission further comprises means for initiating transmission, to the at least one mobile device that is at least proximate to the transport, of the one or more indications that indicate to the given mobile device to utilize the first navigational coordinate system, the second navigational coordinate system, or the combination thereof by linking the first navigational coordinate system and the second navigational coordinate system.

\* \* \* \* \*